US012045765B1

(12) United States Patent
Piotrowski et al.

(10) Patent No.: US 12,045,765 B1
(45) Date of Patent: Jul. 23, 2024

(54) LIGHT-BASED GUIDANCE FOR PACKAGE TRACKING SYSTEMS

(71) Applicant: Position Imaging, Inc., Portsmouth, NH (US)

(72) Inventors: Rafal Piotrowski, Portsmouth, NH (US); Edward L. Hill, Conway, NH (US)

(73) Assignee: Position Imaging, Inc., Portsmouth, NH (US)

( * ) Notice: Subject to any disclaimer, the term of this patent is extended or adjusted under 35 U.S.C. 154(b) by 0 days.

(21) Appl. No.: 17/877,269

(22) Filed: Jul. 29, 2022

Related U.S. Application Data

(63) Continuation of application No. 15/416,379, filed on Jan. 26, 2017, now Pat. No. 11,416,805, which is a continuation-in-part of application No. 15/091,180, filed on Apr. 5, 2016, now Pat. No. 11,501,244.

(60) Provisional application No. 62/221,855, filed on Sep. 22, 2015, provisional application No. 62/143,332, filed on Apr. 6, 2015.

(51) Int. Cl.
*G06Q 10/0833* (2023.01)
(52) U.S. Cl.
CPC .................. *G06Q 10/0833* (2013.01)
(58) Field of Classification Search
CPC .................................................. G06Q 10/0833
See application file for complete search history.

(56) References Cited

U.S. PATENT DOCUMENTS 2,408,122 A 9/1946 Wirkler
3,824,596 A 7/1974 Guion et al.
(Continued)

FOREIGN PATENT DOCUMENTS

DE 102017205958 A1 10/2018
WO 2001006401 A1 1/2001
(Continued)

OTHER PUBLICATIONS

Frontline Solutions, "Automating the pampered chef's new distribution center: the kitchenware merchant managed to automate its facility with both new and refurbished systems, proving that improved didn't have to be new," 5.6, 30, Advanstar Communications, Inc., Jun. 2004.*
(Continued)

*Primary Examiner* — Nathan Erb
(74) *Attorney, Agent, or Firm* — Schmeiser, Olsen & Watts LLP

(57) ABSTRACT

A package tracking system comprises a package room for holding packages intended for delivery to one or more package recipients, an optical sensing device positioned to capture one or more images of each package brought to the package room, one or more light sources, and a computing system including a processor, memory, and executable code stored on the memory. The processor executes the executable code to detect a presence and location of a given package held in the package room based on the one or more images captured by the optical sensing device and on package identification information relating to the given package. The processor further executes the executable code to cause the one or more light sources to shine on or near the given package in the package room to provide light-based guidance specific to the given package.

14 Claims, 10 Drawing Sheets

(56) References Cited

U.S. PATENT DOCUMENTS

| | | |
|---|---|---|
| 3,940,700 A | 2/1976 | Fischer |
| 4,018,029 A | 4/1977 | Safranski et al. |
| 4,328,499 A | 5/1982 | Anderson et al. |
| 4,570,416 A | 2/1986 | Shoenfeld |
| 5,010,343 A | 4/1991 | Andersson |
| 5,343,212 A | 8/1994 | Rose et al. |
| 5,426,438 A | 6/1995 | Peavey et al. |
| 5,510,800 A | 4/1996 | McEwan |
| 5,545,880 A | 8/1996 | Bu et al. |
| 5,574,468 A | 11/1996 | Rose |
| 5,592,180 A | 1/1997 | Yokev et al. |
| 5,600,330 A | 2/1997 | Blood |
| 5,657,026 A | 8/1997 | Culpepper et al. |
| 5,671,362 A | 9/1997 | Cowe et al. |
| 5,923,286 A | 7/1999 | Divakaruni |
| 5,953,683 A | 9/1999 | Hansen et al. |
| 6,088,653 A | 7/2000 | Sheikh et al. |
| 6,101,178 A | 8/2000 | Beal |
| 6,167,347 A | 12/2000 | Lin |
| 6,255,991 B1 | 7/2001 | Hedin |
| 6,285,916 B1 | 9/2001 | Kadaba et al. |
| 6,292,750 B1 | 9/2001 | Lin |
| 6,409,687 B1 | 6/2002 | Foxlin |
| 6,417,802 B1 | 7/2002 | Diesel |
| 6,492,905 B2 | 12/2002 | Mathias et al. |
| 6,496,778 B1 | 12/2002 | Lin |
| 6,512,748 B1 | 1/2003 | Mizuki et al. |
| 6,593,885 B2 | 7/2003 | Wisherd et al. |
| 6,619,550 B1 | 9/2003 | Good et al. |
| 6,630,904 B2 | 10/2003 | Gustafson et al. |
| 6,634,804 B1 | 10/2003 | Toste et al. |
| 6,683,568 B1 | 1/2004 | James et al. |
| 6,697,736 B2 | 2/2004 | Lin |
| 6,720,920 B2 | 4/2004 | Breed et al. |
| 6,721,657 B2 | 4/2004 | Ford et al. |
| 6,744,436 B1 | 6/2004 | Chirieleison, Jr. et al. |
| 6,750,816 B1 | 6/2004 | Kunysz |
| 6,861,982 B2 | 3/2005 | Forstrom et al. |
| 6,867,774 B1 | 3/2005 | Halmshaw et al. |
| 6,988,079 B1 | 1/2006 | Or-Bach et al. |
| 6,989,789 B1 | 1/2006 | Ferreol et al. |
| 7,009,561 B2 | 3/2006 | Menache et al. |
| 7,104,453 B1 | 9/2006 | Zhu et al. |
| 7,143,004 B2 | 11/2006 | Townsend et al. |
| 7,168,618 B2 | 1/2007 | Schwartz |
| 7,190,309 B2 | 3/2007 | Hill |
| 7,193,559 B2 | 3/2007 | Ford et al. |
| 7,236,091 B2 | 6/2007 | Kiang et al. |
| 7,292,189 B2 | 11/2007 | Orr et al. |
| 7,295,925 B2 | 11/2007 | Breed et al. |
| 7,315,281 B2 | 1/2008 | Dejanovic et al. |
| 7,336,078 B1 | 2/2008 | Merewether et al. |
| 7,353,994 B2 | 4/2008 | Farrall et al. |
| 7,407,100 B2 | 8/2008 | Guyett et al. |
| 7,409,290 B2 | 8/2008 | Lin |
| 7,443,342 B2 | 10/2008 | Shirai et al. |
| 7,499,711 B2 | 3/2009 | Hoctor et al. |
| 7,533,569 B2 | 5/2009 | Sheynblat |
| 7,612,715 B2 | 11/2009 | Macleod |
| 7,646,330 B2 | 1/2010 | Karr |
| 7,689,465 B1 | 3/2010 | Shakes et al. |
| 7,844,507 B2 | 11/2010 | Levy |
| 7,868,760 B2 | 1/2011 | Smith et al. |
| 7,876,268 B2 | 1/2011 | Jacobs |
| 7,933,730 B2 | 4/2011 | Li et al. |
| 7,995,109 B2 | 8/2011 | Kamada et al. |
| 8,009,918 B2 | 8/2011 | Van Droogenbroeck et al. |
| 8,189,855 B2 | 5/2012 | Opalach et al. |
| 8,201,737 B1 | 6/2012 | Palacios Durazo et al. |
| 8,219,438 B1 | 7/2012 | Moon et al. |
| 8,269,624 B2 | 9/2012 | Chen et al. |
| 8,295,542 B2 | 10/2012 | Albertson et al. |
| 8,334,513 B1 | 12/2012 | Garvey, III et al. |
| 8,406,470 B2 | 3/2013 | Jones et al. |
| 8,457,655 B2 | 6/2013 | Zhang et al. |
| 8,619,144 B1 | 12/2013 | Chang et al. |
| 8,749,433 B2 | 6/2014 | Hill |
| 8,843,231 B2 | 9/2014 | Ragusa et al. |
| 8,860,611 B1 | 10/2014 | Anderson et al. |
| 8,957,812 B1 | 2/2015 | Hill et al. |
| 9,063,215 B2 | 6/2015 | Perthold et al. |
| 9,092,898 B1 | 7/2015 | Fraccaroli et al. |
| 9,120,621 B1 | 9/2015 | Curlander et al. |
| 9,141,194 B1 | 9/2015 | Keyes et al. |
| 9,171,278 B1 | 10/2015 | Kong et al. |
| 9,174,746 B1 | 11/2015 | Bell et al. |
| 9,269,022 B2 | 2/2016 | Rhoads et al. |
| 9,349,076 B1 | 5/2016 | Liu et al. |
| 9,424,493 B2 | 8/2016 | He et al. |
| 9,482,741 B1 | 11/2016 | Min et al. |
| 9,497,728 B2 | 11/2016 | Hill |
| 9,500,396 B2 | 11/2016 | Yoon et al. |
| 9,514,389 B1 | 12/2016 | Erhan et al. |
| 9,519,344 B1 | 12/2016 | Hill |
| 9,544,552 B2 | 1/2017 | Takahashi |
| 9,594,983 B2 | 3/2017 | Alattar et al. |
| 9,656,749 B1 | 5/2017 | Hanlon |
| 9,740,937 B2 | 8/2017 | Zhang et al. |
| 9,782,669 B1 | 10/2017 | Hill |
| 9,872,151 B1 | 1/2018 | Puzanov et al. |
| 9,904,867 B2 | 2/2018 | Fathi et al. |
| 9,933,509 B2 | 4/2018 | Hill et al. |
| 9,961,503 B2 | 5/2018 | Hill |
| 9,996,818 B1 | 6/2018 | Ren et al. |
| 10,001,833 B2 | 6/2018 | Hill |
| 10,148,918 B1 | 12/2018 | Seiger et al. |
| 10,163,149 B1 | 12/2018 | Famularo et al. |
| 10,180,490 B1 | 1/2019 | Schneider et al. |
| 10,257,654 B2 | 4/2019 | Hill |
| 10,324,474 B2 | 6/2019 | Hill et al. |
| 10,332,066 B1 | 6/2019 | Palaniappan et al. |
| 10,373,322 B1 | 8/2019 | Buibas et al. |
| 10,399,778 B1 | 9/2019 | Shekhawat et al. |
| 10,416,276 B2 | 9/2019 | Hill et al. |
| 10,444,323 B2 | 10/2019 | Min et al. |
| 10,455,364 B2 | 10/2019 | Hill |
| 10,605,904 B2 | 3/2020 | Min et al. |
| 10,664,795 B1 * | 5/2020 | Worley ............... G06Q 10/087 |
| 10,853,757 B1 | 12/2020 | Hill et al. |
| 11,361,536 B2 | 6/2022 | Chakravarty et al. |
| 11,416,805 B1 | 8/2022 | Piotrowski et al. |
| 11,562,318 B2 | 1/2023 | Robinson et al. |
| 2001/0027995 A1 | 10/2001 | Patel et al. |
| 2002/0021277 A1 | 2/2002 | Kramer et al. |
| 2002/0095353 A1 * | 7/2002 | Razumov ............... G06Q 30/06 705/26.81 |
| 2002/0140745 A1 | 10/2002 | Ellenby et al. |
| 2002/0177476 A1 | 11/2002 | Chou |
| 2003/0024987 A1 | 2/2003 | Zhu |
| 2003/0053492 A1 | 3/2003 | Matsunaga |
| 2003/0110152 A1 | 6/2003 | Hara |
| 2003/0115162 A1 | 6/2003 | Konick |
| 2003/0120425 A1 | 6/2003 | Stanley et al. |
| 2003/0132279 A1 | 7/2003 | Stemmle |
| 2003/0176196 A1 | 9/2003 | Hall et al. |
| 2003/0184649 A1 | 10/2003 | Mann |
| 2003/0195017 A1 | 10/2003 | Chen et al. |
| 2004/0002642 A1 | 1/2004 | Dekel et al. |
| 2004/0095907 A1 | 5/2004 | Agee et al. |
| 2004/0107072 A1 | 6/2004 | Dietrich et al. |
| 2004/0176102 A1 | 9/2004 | Lawrence et al. |
| 2004/0203846 A1 | 10/2004 | Caronni et al. |
| 2004/0267640 A1 | 12/2004 | Bong et al. |
| 2005/0001712 A1 | 1/2005 | Yarbrough |
| 2005/0057647 A1 | 3/2005 | Nowak |
| 2005/0062849 A1 | 3/2005 | Foth et al. |
| 2005/0074162 A1 | 4/2005 | Tu et al. |
| 2005/0143916 A1 | 6/2005 | Kim et al. |
| 2005/0154685 A1 | 7/2005 | Mundy et al. |
| 2005/0184907 A1 | 8/2005 | Hall et al. |
| 2005/0275626 A1 | 12/2005 | Mueller et al. |
| 2006/0013070 A1 | 1/2006 | Holm et al. |
| 2006/0022800 A1 | 2/2006 | Krishna et al. |
| 2006/0061469 A1 | 3/2006 | Jaeger et al. |

(56) References Cited

U.S. PATENT DOCUMENTS

| | | |
|---|---|---|
| 2006/0066485 A1 | 3/2006 | Min |
| 2006/0101497 A1 | 5/2006 | Hirt et al. |
| 2006/0192709 A1 | 8/2006 | Schantz et al. |
| 2006/0208893 A1 | 9/2006 | Anson et al. |
| 2006/0279459 A1 | 12/2006 | Akiyama et al. |
| 2006/0290508 A1 | 12/2006 | Moutchkaev et al. |
| 2007/0060384 A1 | 3/2007 | Dohta |
| 2007/0073552 A1 | 3/2007 | Hileman |
| 2007/0138270 A1 | 6/2007 | Reblin |
| 2007/0205867 A1 | 9/2007 | Kennedy et al. |
| 2007/0210920 A1 | 9/2007 | Panotopoulos |
| 2007/0222560 A1 | 9/2007 | Posamentier |
| 2007/0237356 A1 | 10/2007 | Dwinell et al. |
| 2008/0007398 A1 | 1/2008 | DeRose et al. |
| 2008/0035390 A1 | 2/2008 | Wurz |
| 2008/0048913 A1 | 2/2008 | Macias et al. |
| 2008/0143482 A1 | 6/2008 | Shoarinejad et al. |
| 2008/0150678 A1 | 6/2008 | Giobbi et al. |
| 2008/0154691 A1 | 6/2008 | Wellman et al. |
| 2008/0156619 A1 | 7/2008 | Patel et al. |
| 2008/0174485 A1 | 7/2008 | Carani et al. |
| 2008/0183328 A1 | 7/2008 | Danelski |
| 2008/0204322 A1 | 8/2008 | Oswald et al. |
| 2008/0266253 A1 | 10/2008 | Seeman et al. |
| 2008/0281618 A1 | 11/2008 | Mermet et al. |
| 2008/0316324 A1 | 12/2008 | Rofougaran et al. |
| 2009/0043504 A1 | 2/2009 | Bandyopadhyay et al. |
| 2009/0073428 A1 | 3/2009 | Magnus et al. |
| 2009/0114575 A1 | 5/2009 | Carpenter et al. |
| 2009/0121017 A1 | 5/2009 | Cato et al. |
| 2009/0149202 A1 | 6/2009 | Hill et al. |
| 2009/0164277 A1 | 6/2009 | Bhattacharya |
| 2009/0224040 A1 | 9/2009 | Kushida et al. |
| 2009/0243932 A1 | 10/2009 | Moshfeghi |
| 2009/0245573 A1 | 10/2009 | Saptharishi et al. |
| 2009/0323586 A1 | 12/2009 | Hohl et al. |
| 2010/0019905 A1 | 1/2010 | Boddie et al. |
| 2010/0076594 A1 | 3/2010 | Salour et al. |
| 2010/0090852 A1 | 4/2010 | Eitan et al. |
| 2010/0097208 A1 | 4/2010 | Rosing et al. |
| 2010/0103173 A1 | 4/2010 | Lee et al. |
| 2010/0103989 A1 | 4/2010 | Smith et al. |
| 2010/0123664 A1 | 5/2010 | Shin et al. |
| 2010/0131340 A1 | 5/2010 | Brown et al. |
| 2010/0159958 A1 | 6/2010 | Naguib et al. |
| 2010/0213256 A1 | 8/2010 | Fjellstad et al. |
| 2011/0002509 A1 | 1/2011 | Nobori et al. |
| 2011/0006774 A1 | 1/2011 | Baiden |
| 2011/0037573 A1 | 2/2011 | Choi |
| 2011/0066086 A1 | 3/2011 | Aarestad et al. |
| 2011/0143779 A1 | 6/2011 | Rowe et al. |
| 2011/0166694 A1 | 7/2011 | Griffits et al. |
| 2011/0187600 A1 | 8/2011 | Landt |
| 2011/0208481 A1 | 8/2011 | Slastion |
| 2011/0210843 A1 | 9/2011 | Kummetz |
| 2011/0241942 A1 | 10/2011 | Hill |
| 2011/0256882 A1 | 10/2011 | Markhovsky et al. |
| 2011/0264520 A1 | 10/2011 | Puhakka |
| 2011/0286633 A1 | 11/2011 | Wang et al. |
| 2011/0313893 A1 | 12/2011 | Weik, III |
| 2011/0315770 A1 | 12/2011 | Patel et al. |
| 2012/0013509 A1 | 1/2012 | Wisherd et al. |
| 2012/0020518 A1 | 1/2012 | Taguchi |
| 2012/0030133 A1* | 2/2012 | Rademaker ............ G06Q 10/08 705/333 |
| 2012/0081544 A1 | 4/2012 | Wee |
| 2012/0087572 A1 | 4/2012 | Dedeoglu et al. |
| 2012/0127088 A1 | 5/2012 | Panceet et al. |
| 2012/0176227 A1 | 7/2012 | Nikitin |
| 2012/0184285 A1 | 7/2012 | Sampath et al. |
| 2012/0257061 A1 | 10/2012 | Edwards et al. |
| 2012/0286933 A1 | 11/2012 | Hsiao |
| 2012/0319822 A1 | 12/2012 | Hansen |
| 2013/0010144 A1 | 1/2013 | Park |
| 2013/0017812 A1 | 1/2013 | Foster |
| 2013/0018582 A1 | 1/2013 | Miller et al. |
| 2013/0021417 A1 | 1/2013 | Ota et al. |
| 2013/0029685 A1 | 1/2013 | Moshfeghi |
| 2013/0036043 A1 | 2/2013 | Faith |
| 2013/0051624 A1 | 2/2013 | Iwasaki et al. |
| 2013/0063567 A1 | 3/2013 | Burns et al. |
| 2013/0073093 A1 | 3/2013 | Songkakul |
| 2013/0094693 A1 | 4/2013 | Bolton |
| 2013/0113993 A1 | 5/2013 | Dagit, III |
| 2013/0117377 A1* | 5/2013 | Miller ............... A63F 13/35 709/205 |
| 2013/0166067 A1 | 6/2013 | Irwin et al. |
| 2013/0182114 A1 | 7/2013 | Zhang et al. |
| 2013/0191193 A1 | 7/2013 | Calman et al. |
| 2013/0226655 A1 | 8/2013 | Shaw |
| 2013/0281084 A1 | 10/2013 | Batada et al. |
| 2013/0293684 A1 | 11/2013 | Becker et al. |
| 2013/0293722 A1 | 11/2013 | Chen |
| 2013/0314210 A1 | 11/2013 | Schoner et al. |
| 2013/0335318 A1 | 12/2013 | Nagel et al. |
| 2013/0335415 A1 | 12/2013 | Chang |
| 2014/0022058 A1 | 1/2014 | Striemer et al. |
| 2014/0108136 A1 | 4/2014 | Zhao et al. |
| 2014/0139426 A1 | 5/2014 | Kryze et al. |
| 2014/0253368 A1 | 9/2014 | Holder |
| 2014/0270356 A1* | 9/2014 | Dearing ............... B07C 7/005 382/103 |
| 2014/0300516 A1 | 10/2014 | Min et al. |
| 2014/0317005 A1 | 10/2014 | Balwani |
| 2014/0330603 A1 | 11/2014 | Corder et al. |
| 2014/0357295 A1 | 12/2014 | Skomra et al. |
| 2014/0361078 A1 | 12/2014 | Davidson |
| 2015/0009949 A1 | 1/2015 | Khoryaev et al. |
| 2015/0012396 A1 | 1/2015 | Puerini et al. |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0055821 A1 | 2/2015 | Fotland |
| 2015/0059374 A1 | 3/2015 | Hebel |
| 2015/0085096 A1 | 3/2015 | Smits |
| 2015/0091757 A1 | 4/2015 | Shaw et al. |
| 2015/0130664 A1 | 5/2015 | Hill et al. |
| 2015/0133162 A1 | 5/2015 | Meredith et al. |
| 2015/0134418 A1 | 5/2015 | Leow et al. |
| 2015/0169916 A1 | 6/2015 | Hill et al. |
| 2015/0170002 A1 | 6/2015 | Szegedy et al. |
| 2015/0202770 A1 | 7/2015 | Patron et al. |
| 2015/0210199 A1 | 7/2015 | Payne |
| 2015/0221135 A1 | 8/2015 | Hill et al. |
| 2015/0227890 A1 | 8/2015 | Bednarek et al. |
| 2015/0248765 A1 | 9/2015 | Criminisi et al. |
| 2015/0254906 A1 | 9/2015 | Berger et al. |
| 2015/0278759 A1 | 10/2015 | Harris et al. |
| 2015/0310539 A1 | 10/2015 | McCoy et al. |
| 2015/0323643 A1 | 11/2015 | Hill et al. |
| 2015/0341551 A1 | 11/2015 | Perrin et al. |
| 2015/0362581 A1 | 12/2015 | Friedman et al. |
| 2015/0371178 A1 | 12/2015 | Abhyanker et al. |
| 2015/0371319 A1 | 12/2015 | Argue et al. |
| 2015/0379366 A1 | 12/2015 | Nomura et al. |
| 2016/0035078 A1 | 2/2016 | Lin et al. |
| 2016/0063610 A1 | 3/2016 | Argue et al. |
| 2016/0093184 A1 | 3/2016 | Locke et al. |
| 2016/0098679 A1 | 4/2016 | Levy |
| 2016/0140436 A1 | 5/2016 | Yin et al. |
| 2016/0142868 A1 | 5/2016 | Kulkarni et al. |
| 2016/0150196 A1 | 5/2016 | Horvath |
| 2016/0156409 A1 | 6/2016 | Chang |
| 2016/0178727 A1 | 6/2016 | Bottazzi |
| 2016/0180283 A1* | 6/2016 | Ghosh ............... G06Q 10/087 705/28 |
| 2016/0180667 A1 | 6/2016 | Bunker et al. |
| 2016/0189277 A1 | 6/2016 | Davis |
| 2016/0195602 A1 | 7/2016 | Meadow |
| 2016/0232857 A1 | 8/2016 | Tamaru |
| 2016/0238692 A1 | 8/2016 | Hill et al. |
| 2016/0248969 A1 | 8/2016 | Hurd |
| 2016/0256100 A1 | 9/2016 | Jacofsky et al. |
| 2016/0286508 A1 | 9/2016 | Khoryaev et al. |

(56) References Cited

U.S. PATENT DOCUMENTS

| | | |
|---|---|---|
| 2016/0300187 A1 | 10/2016 | Kashi et al. |
| 2016/0335593 A1 | 11/2016 | Clarke et al. |
| 2016/0366561 A1 | 12/2016 | Min et al. |
| 2016/0370453 A1 | 12/2016 | Boker et al. |
| 2016/0371574 A1 | 12/2016 | Nguyen et al. |
| 2017/0030997 A1 | 2/2017 | Hill et al. |
| 2017/0031432 A1 | 2/2017 | Hill |
| 2017/0066597 A1 | 3/2017 | Hiroi |
| 2017/0094251 A1 | 3/2017 | Wolke et al. |
| 2017/0117233 A1 | 4/2017 | Anayama et al. |
| 2017/0123426 A1 | 5/2017 | Hill et al. |
| 2017/0140329 A1 | 5/2017 | Bernhardt et al. |
| 2017/0234979 A1 | 8/2017 | Mathews et al. |
| 2017/0261592 A1 | 9/2017 | Min et al. |
| 2017/0280281 A1 | 9/2017 | Pandey et al. |
| 2017/0293885 A1 | 10/2017 | Grady et al. |
| 2017/0313514 A1 | 11/2017 | Lert, Jr. et al. |
| 2017/0323174 A1 | 11/2017 | Joshi et al. |
| 2017/0323376 A1 | 11/2017 | Glaser et al. |
| 2017/0350961 A1 | 12/2017 | Hill et al. |
| 2017/0351255 A1 | 12/2017 | Anderson et al. |
| 2017/0359573 A1 | 12/2017 | Kim et al. |
| 2017/0372524 A1 | 12/2017 | Hill |
| 2017/0374261 A1 | 12/2017 | Teich et al. |
| 2018/0003962 A1 | 1/2018 | Urey et al. |
| 2018/0025417 A1 | 1/2018 | Brathwaite et al. |
| 2018/0033151 A1 | 2/2018 | Matsumoto et al. |
| 2018/0068100 A1 | 3/2018 | Seo |
| 2018/0068266 A1 | 3/2018 | Kirmani et al. |
| 2018/0094936 A1 | 4/2018 | Jones et al. |
| 2018/0108134 A1 | 4/2018 | Venable et al. |
| 2018/0139431 A1 | 5/2018 | Simek et al. |
| 2018/0164103 A1 | 6/2018 | Hill |
| 2018/0197139 A1 | 7/2018 | Hill |
| 2018/0197218 A1 | 7/2018 | Mallesan et al. |
| 2018/0231649 A1 | 8/2018 | Min et al. |
| 2018/0242111 A1 | 8/2018 | Hill |
| 2018/0339720 A1 | 11/2018 | Singh |
| 2019/0029277 A1 | 1/2019 | Skraedderdal et al. |
| 2019/0053012 A1 | 2/2019 | Hill |
| 2019/0073785 A1 | 3/2019 | Hafner et al. |
| 2019/0090744 A1 | 3/2019 | Mahfouz |
| 2019/0098263 A1 | 3/2019 | Seiger et al. |
| 2019/0138849 A1 | 5/2019 | Zhang |
| 2019/0295290 A1 | 9/2019 | Schena et al. |
| 2019/0394448 A1 | 12/2019 | Ziegler et al. |
| 2020/0005116 A1 | 1/2020 | Kuo |
| 2020/0011961 A1 | 1/2020 | Hill et al. |
| 2020/0012894 A1 | 1/2020 | Lee |
| 2020/0097724 A1 | 3/2020 | Chakravarty et al. |
| 2022/0405704 A1 | 12/2022 | Kirmani |

FOREIGN PATENT DOCUMENTS

| | | |
|---|---|---|
| WO | 2005010550 A1 | 2/2005 |
| WO | 2007130529 A2 | 11/2007 |
| WO | 2009007198 A1 | 1/2009 |
| WO | 2018067127 A1 | 4/2018 |
| WO | 2020061276 A1 | 3/2020 |

OTHER PUBLICATIONS

Bruno, Antony, "The Naras network: quick response bar codes geo-location, augmented reality, 'Music is life is music'—@TheGrammys kicks up social media way beyond just Facebook and Twitter," Billboard, 123.5, 12(1), e5 Global Media, LLC, Feb. 12, 2011.*

Dictionary Definition for Peripheral Equipment. (2001). Hargrave's Communications Dictionary, Wiley. Hoboken, NJ: Wiley. Retrieved from Https://search.credorefernce.com/content/entry/hargravecomms/peripheral_equioment/0 (Year:2001).

Non-Final Office Action in U.S. Appl. No. 15/091,180, mailed Jun. 27, 2019; 11 pages.

Farrell & Barth, "The Global Positioning System & Inertial Navigation", 1999, McGraw-Hill; pp. 245-252.

Brown, et al., "Automatic Panoramic Image Stitching Using Invariant Features", International Journal of Computer Vision, vol. 74, No. 1, pp. 59-73, 2007.

Restriction Requirement in U.S. Appl. No. 15/091,180 mailed Mar. 19, 2019; 8 pages.

Final Office Action in U.S. Appl. No. 16/206,745 mailed on May 22, 2019; 9 pages.

Non-Final Office Action in U.S. Appl. No. 15/416,366 mailed on Jun. 13, 2019; 11 pages.

Non-Final Office Action in U.S. Appl. No. 15/259,474 mailed on May 29, 2019; 19 pages.

Non-Final Office Action in U.S. Appl. No. 16/740,679, mailed on Jan. 6, 2021; 15 pages.

Notice of Allowance and Fees Due in U.S. Appl. No. 16/437,767, mailed on May 14, 2021; 8 pages.

Non-Final Office Action in U.S. Appl. No. 16/206,745 mailed on Oct. 18, 2019; 8 pages.

Final Office Action in U.S. Appl. No. 15/416,366 mailed on Oct. 7, 2019; 14 pages.

Final Office Action in U.S. Appl. No. 16/206,745 mailed on Feb. 5, 2020; 15 pages.

Non-Final Office Action in U.S. Appl. No. 15/416,366 mailed Apr. 6, 2020; 13 pages.

Final Office Action in U.S. Appl. No. 15/259,474, mailed Jan. 10, 2020; 19 pages.

Non-Final Office Action in U.S. Appl. No. 15/861,414 mailed on Apr. 6, 2020; 14 pages.

Final Office Action in U.S. Appl. No. 15/091,180, mailed on Jan. 23, 2020; 17 pages.

Non-Final Office Action in U.S. Appl. No. 16/437,767, mailed on Jul. 15, 2020; 19 pages.

Corrected Notice of Allowability in U.S. Appl. No. 15/270,749 mailed on Oct. 30, 2018; 5 pages.

Notice of Allowance in U.S. Appl. No. 15/416,366 mailed on Aug. 19, 2020; 13 pages.

International Search Report and Written Opinion in PCT/US2019/051874 mailed on Dec. 13, 2020; 9 pages.

International Search Report and Written Opinion in PCT/US2020/013280 mailed on Mar. 10, 2020; 9 pages.

Raza, Rana Hammad "Three Dimensional Localization and Tracking for Site Safety Using Fusion of Computer Vision and RFID," 2013, Dissertation, Michigan State University.

Non-Final Office Action in U.S. Appl. No. 15/091,180 mailed on Oct. 1, 2020.

Non-Final Office Action in U.S. Appl. No. 15/259,474, mailed on Sep. 1, 2020; 17 pages.

Final Office Action in U.S. Appl. No. 15/861,414 mailed on Nov. 17, 2020.

Non-Final Office Action in U.S. Appl. No. 16/206,745 mailed on Sep. 23, 2020.

Final Office Action in U.S. Appl. No. 15/091,180, mailed Mar. 10, 2021; 24 pages.

Notice of Allowance and Fees Due in U.S. Appl. No. 16/206,745, mailed Mar. 12, 2021; 9 pages.

Final Office Action in U.S. Appl. No. 15/259,474, mailed Mar. 9, 2021; 23 pages.

Final Office Action in U.S. Appl. No. 15/861,414 mailed on Feb. 8, 2021.

Final Office Action in U.S. Appl. No. 16/437,767 mailed on Feb. 5, 2021.

Non-Final Office Action in U.S. Appl. No. 16/575,837, mailed on Apr. 21, 2021; 18 pages.

Notice of Allowance and Fees Due in U.S. Appl. No. 16/740,679, mailed on Apr. 20, 2021; 15 pages.

International Preliminary Report on Patentability in PCT/US2019/051874 mailed on Apr. 1, 2021.

International Preliminary Report on Patentability in PCT/US2020/013280 mailed on Jul. 22, 2021.

Final Office Action in U.S. Appl. No. 15/091,180 mailed on May 12, 2022; 7 pages.

(56) References Cited

OTHER PUBLICATIONS

Non-Final Office Action in U.S. Appl. No. 15/259,474 mailed on Aug. 26, 2021.
Non-Final Office Action in U.S. Appl. No. 15/861,414 mailed on Aug. 26, 2021.
Final Office Action in U.S. Appl. No. 16/575,837 mailed on Sep. 3, 2021.
Non-Final Office Action in U.S. Appl. No. 15/091,180 mailed on Sep. 1, 2021.
Final Office Action in U.S. Appl. No. 15/259,474 mailed on Feb. 8, 2022.
Final Office Action in U.S. Appl. No. 15/861,414 mailed on Mar. 16, 2022.
Notice of Allowance in U.S. Appl. No. 15/091,180 mailed on Sep. 21, 2022.
"ADXL202/ADXL210 Product Sheet," Analog Devices, Inc., Analog.com, 1999; 11 pages.
Goodall, Christopher L., "Improving Usability of Low-Cost INS/GPS Navigation Systems using Intelligent Techniques", Jan. 2009, UCGE Reports No. 20276; 234 pages.
Debo Sun, "Ultra-Tight GPS/Reduced IMU for Land Vehicle Navigation", Mar. 2010, UCGE Reports No. 20305; 254 pages.
Adrian Schumacher, "Integration of a GPS aided Strapdown Inertial Navigation System for Land Vehicles", Master of Science Thesis, KTH Electrical Engineering, 2006; 67 pages.
Farrell, et al., "Real-Time Differential Carrier Phase GPS-Aided INS", Jul. 2000, IEEE Transactions on Control Systems Technology, vol. 8, No. 4; 13 pages.
Filho, et al., "Integrated GPS/INS Navigation System Based on a Gyroscope-Free IMU", Dincon Brazilian Conference on Synamics, Control, and Their Applications, May 22-26, 2006; 6 pages.
Non-Final Office Action in U.S. Appl. No. 17/104,157 mailed on Mar. 29, 2023.
Non-Final Office Action in U.S. Appl. No. 17/894,472 mailed on Apr. 26, 2023.
Non-Final Office Action in U.S. Appl. No. 17/962,632 mailed on Mar. 31, 2023.
Morbella N50: 5-inch GPS Navigator User's Manual, Maka Technologies Group, May 2012.
Notice of Allowance in U.S. Appl. No. 15/259,474, mailed on Jul. 11, 2022.
Szeliski, R., "Image Alignment and Stitching: A Tutorial", Technical Report, MST-TR-2004-92, Dec. 10, 2006.
Non-Final Office Action in U.S. Appl. No. 16/206,745, mailed on Jan. 7, 2019; 10 pages.
Non-Final Office Action in U.S. Appl. No. 17/371,479 mailed on Aug. 18, 2022.
Wilde, Andreas, "Extended Tracking Range Delay-Locked Loop," Proceedings IEEE International Conference on Communications, Jun. 1995, pp. 1051-1054.
Notice of Allowance in U.S. Appl. No. 15/270,749 mailed on Oct. 4, 2018; 5 pages.
Non-Final Office Action in U.S. Appl. No. 15/416,379 mailed on Jun. 27, 2019; 12 pages.
Final Office Action in U.S. Appl. No. 15/416,379 mailed on Jan. 27, 2020; 15 pages.
Grewal & Andrews, "Global Positioning Systems, Inertial Navigation and Integration", 2001, John Weiley and Sons, pp. 252-256.
Jianchen Gao, "Development of a Precise GPS/INS/On-Board Vehicle Sensors Integrated Vehicular Positioning System", Jun. 2007, UCGE Reports No. 20555; 245 pages.
Yong Yang, "Tightly Coupled MEMS INS/GPS Integration with INS Aided Receiver Tracking Loops" Jun. 2008, UCGE Reports No. 20270; 205 pages.
Sun, et al., "Analysis of the Kalman Filter With Different INS Error Models for GPS/INS Integration in Aerial Remote Sensing Applications", Bejing, 2008, The International Archives of the Photogrammerty, Remote Sensing and Spatial Information Sciences vol. Nov. 14, 2016 IDS11-14-2016 IDS11-14-2016 IDSVII, Part B5.; 8 pages.
Non-Final Office Action in U.S. Appl. No. 15/416,379 mailed on Oct. 2, 2020; 19 pages.
Final Office Action in U.S. Appl. No. 15/416,379 mailed on May 13, 2021; 18 pages.
Advisory Action in U.S. Appl. No. 15/416,379 mailed on Aug. 18, 2021; 7 pages.
Ex Parte Quayle Action in U.S. Appl. No. 15/416,379 mailed on Oct. 5, 2021; 6 pages.
Notice of Allowance in U.S. Appl. No. 15/416,379 mailed on Mar. 30, 2022; 16 pages.
Corrected Notice of Allowability in U.S. Appl. No. 15/416,379 mailed on May 17, 2022; 2 pages.
Supplemental Notice of Allowance in U.S. Appl. No. 15/416,379 mailed on Jul. 21, 2022; 2 pages.
Li, et al. "Multifrequency-Based Range Estimation of RFID Tags," IEEE International Conference on RFID, 2009.
Welch, Greg and Gary Bishop, "An Introduction to the Kalman Filter," Department of Computer Science, University of North Carolina at Chapel Hill, Chapel Hill, NC 27599-3175, Updated: Monday, Jul. 24, 2006.
Hill, et al. "Package Tracking Systems and Methods" U.S. Appl. No. 15/091,180, filed Apr. 5, 2016.
Non-Final Office Action in U.S. Appl. No. 15/270,749 mailed on Apr. 4, 2018; 8 pages.
Xu, et al., "Performance Evaluation of Color Correction Approaches for Automatic Multi-View Image and Video Stitching", International Conference on Computer Vision and Pattern Recognition (CVPR10), San Francisco, CA, 2010.
Shakeri, Moein and Hong Zhang, "Cooperative Targeting: Detection and Tracking of Small Objects with a Dual Camera System" Field and Service Robotics, Springer, Cham, 2015.
Schmidt & Phillips, "INS/GPS Integration Architectures", NATO RTO Lecture Series, First Presented Oct. 20-21, 2003; 24 pages.
Vikas Kumar N., "Integration of Inertial Navigation System and Global Positioning System Using Kalman Filtering", M. Tech Dissertation, Indian Institute of Technology, Bombay, Mumbai, Jul. 2004; 69 pages.
Jennifer Denise Gautier, "GPS/INS Generalized Evaluation Tool (GIGET) for the Design and Testing of Integrated Navigation Systems", Dissertation, Stanford University, Jun. 2003; 160 pages.
Santiago Alban, "Design and Performance of a Robust GPS/INS Attitude System for Automobile Applications", Dissertation, Stanford University, Jun. 2004; 218 pages.
International Search Report & Written Opinion in International Patent Application No. PCT/US12/64860, mailed on Feb. 28, 2013; 14 pages.
Proakis, John G. and Masoud Salehi, "Communication Systems Engineering", Second Edition, Prentice-Hall, Inc., Upper Saddle River, New Jersey, 2002; 815 pages.
Pourhomayoun, Mohammad and Mark Fowler, "Improving WLAN-based Indoor Mobile Positioning Using Sparsity," Conference Record of the Forty Si11-14-2016 IDSth Asilomar Conference on Signals, Systems and Computers, Nov. 4-7, 2012, pp. 1393-1396, Pacific Grove, California.
Non-Final Office Action in U.S. Appl. No. 15/861,414 mailed on Dec. 16, 2022.
Notice of Allowance in U.S. Appl. No. 17/371,479 mailed on Dec. 20, 2022.
Notice of Allowance in U.S. Appl. No. 17/104,158, mailed on Dec. 28, 2023.
Final Office Action in U.S. Appl. No. 17/104,158 mailed on Sep. 21, 2023.
Final Office Action in U.S. Appl. No. 17/894,472 mailed on Oct. 19, 2023.
Non-Final Office Action in U.S. Appl. No. 18/184,486 mailed on Sep. 28, 2023.
Restriction Requirement in U.S. Appl. No. 17/472,978 mailed on Nov. 6, 2023.
Final Office Action in U.S. Appl. No. 17/962,632 mailed on Sep. 25, 2023.
Notice of Allowance in U.S. Appl. No. 17/962,632 mailed on Jan. 30, 2024.

(56) References Cited

OTHER PUBLICATIONS

Notice of Allowance in U.S. Appl. No. 17/894,472 mailed on Jan. 31, 2024.
Non-Final Office Action in U.S. Appl. No. 17/472,978 mailed on Mar. 6, 2024.
Final Office Action in U.S. Appl. No. 18/184,486 mailed on Mar. 22, 2024.
Farmer, Michael E and Anil K. Jain, "Smart Automotive Airbags: Occupant Classification and Tracking" IEEE Transactions on Vehicular Technology, vol. 56, No. 1, Jan. 2007, pp. 60-80.

* cited by examiner

LIGHT-BASED GUIDANCE FOR PACKAGE TRACKING SYSTEMS

RELATED APPLICATIONS

This application is a continuation of U.S. application Ser. No. 15/416,379, filed Jan. 26, 2017, titled "Light-Based Guidance for Package Tracking Systems", which is a continuation-in-part of U.S. application Ser. No. 15/091,180, filed Apr. 5, 2016, titled "Package and Asset Tracking System", which claims the benefit of and priority to U.S. provisional application No. 62/143,332, filed Apr. 6, 2015, titled "Package Tracking System using Sensors," and to U.S. provisional application No. 62/221,855, filed Sep. 22, 2015, titled "Package Tracking System using Sensors," the entireties of which non-provisional and provisional applications are incorporated by reference herein.

FIELD OF THE INVENTION

The invention relates generally to systems and methods of tracking packages and other assets.

BACKGROUND

The shipping of packages, including, but not limited to, letters, parcels, containers, and boxes of any shape and size, is big business, one that grows annually because of online shopping. Every day, people and businesses from diverse locations throughout the world ship millions of packages. Efficient and precise delivery of such packages to their correct destinations entails complex logistics.

Most package shippers currently use barcodes on packages to track movement of the packages through their delivery system. Each barcode stores information about its package; such information may include the dimensions of the package, its weight and destination. When shipping personnel pick up a package, he or she scans the barcode to sort the package appropriately. The delivery system uses this scanned information to track movement of the package.

For example, upon arriving at the city of final destination, a package rolls off a truck or plane on a roller belt. Personnel scan the package, and the system recognizes that the package is at the city of final destination. The system assigns the package to an appropriate delivery truck with an objective of having delivery drivers operating at maximum efficiency. An employee loads the delivery truck, scanning the package while loading it onto the truck. The scanning operates to identify the package as "out for delivery". The driver of the delivery truck also scans the package upon delivery to notify the package-delivery system that the package has reached its final destination.

Such a package-delivery system provides discrete data points for tracking packages, but it has its weaknesses: there can be instances where the position or even the existence of the package is unknown. For example, a package loader may scan a package for loading on delivery truck A, but the package loader may place the package erroneously on delivery truck B. In the previously described package-delivery system, there is no way to prevent or quickly discover this error.

Further, package-delivery systems can be inefficient. Instructions often direct the person who is loading a delivery truck to load it for optimized delivery. This person is usually not the delivery person. Thus, his or her perception of an efficient loading strategy may differ greatly from that of the person unloading the vehicle. Further, different loaders may pack a vehicle differently. Additionally, the loader may toss packages into the truck or misplace them. Packages may also shift during transit. Time expended by drivers searching for packages in a truck is expended cost and an inefficiency that financially impacts the shippers.

Industry has made attempts to track packages efficiently. One such attempt places RFID (Radio Frequency Identification) chips on the packages. Such a solution requires additional systems and hardware. For instance, this solution requires the placement of an RFID tag on every package and the use of readers by package loaders or the placement of readers throughout the facility to track packages.

SUMMARY

All examples and features mentioned below can be combined in any technically possible way.

In one aspect, a package tracking system comprises a package room for holding packages intended for delivery to one or more package recipients, an optical sensing device positioned to capture one or more images of each package brought to the package room, one or more light sources, and a computing system including a processor, memory, and executable code stored on the memory. The processor executes the executable code to detect a presence and location of a given package held in the package room based on the one or more images captured by the optical sensing device and on package identification information relating to the given package. The processor further executes the executable code to cause the one or more light sources to shine on or near the given package in the package room to provide light-based guidance specific to the given package.

The processor may execute the executable code to cause the one or more light sources to shine on or near the given package in the package room to show a person retrieving the given package where the given package resides by shining light on or near the given package in the package room. The one or more light sources may comprise a strip of lights disposed at a front region of package shelving, wherein the processor executes the executable code to cause a given light in the strip of lights to illuminate to show where the given package resides, the given light in the strip of lights being located near the given package on the package shelving.

The processor may execute the executable code to cause the one or more light sources to focus light onto or illuminate a location where a package being dropped off is to be placed in the package room, to superimpose a light-based image on or near the given package in the package room, wherein the superimposed light-based image is a text message, or both. The text message may indicate a public service notice, a traffic notice, a weather condition notice, or any combination thereof.

The processor may execute the executable code to cause the one or more light sources to produce an outline around a region of the package room, wherein the outline corresponds to a field of view of the optical sensing device.

The one or more light sources may be coupled directly to the optical sensing device and the outline produced by the one or more light sources that corresponds to the field of view of the optical sensing device is predetermined by the coupling.

The one or more light sources may be independent of the optical sensing device and calibrated to the optical sensing device to establish the field of view of the optical sensing device.

In another aspect, provided is a method of providing light-based guidance in a package tracking system. The method comprises holding in a package room packages intended for delivery to one or more package recipients, capturing one or more images of each package brought to the package room, detecting a presence and location of a given package being held in the package room based on the one or more images captured of the given package and on package identification information relating to the given package, shining light on or near the given package in the package room to provide light-based guidance specific to the given package.

The shining of a light on or near the given package in the package room may operate to show a person retrieving the given package where the given package resides in the package room.

The method may further comprise illuminating a location where a package that is being dropped off is to be placed in the package room, or superimposing a light-based image on or near the given package in the package room. The superimposed light-based image may be a text message. The text message may indicate a public service notice, a traffic notice, a weather condition notice, or a combination thereof.

The method may further comprise displaying an outline around a region of the package room, wherein the outline corresponds to a field of view of an optical sensing device disposed in the package room.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Package tracking systems described herein actively tracking packages continuously. Advantageously such systems may not require major alterations in personnel behavior and can be implemented with low hardware cost. In general, these systems employ cameras, depth sensors, or other optical sensors (herein referred to generally as cameras) to track packages, objects, assets, or items (herein referred to generally as packages). The cameras are placed in or adjacent to the holding area for the packages, for example, the cargo bay of a delivery vehicle or a package room. One or more cameras can also be situated near a package conveyor or roller belt, to track the movement of packages optically before the packages are placed into a holding area. A package barcode is scanned in conjunction with it being moved into the holding area. As used herein, a barcode is any readable or scannable medium, examples of which include, but are not limited to, an electronic, magnetic, optical, electromagnetic, infrared, or semiconductor media, or any suitable combination thereof. Package identification information about the package is determined from scanning the package barcode. Such package identification information typically includes dimensions, weight, contents or other information that may be utilized to detect and track the package.

An image processor analyzes the video stream from the cameras associated with the holding area to detect the presence of the package(s) contained within. When a package is identified, the image processor determines if the package corresponds to the package data derived from the package barcode. If the package barcode data and package image data match with a high degree of confidence, the system marks the package as existing within the camera area of coverage (e.g., within the delivery vehicle). Any user that thereafter views a stream of the camera view or a static image of the packages inside the holding area may receive an overlay that identifies the packages contained therein and their precise location.

A package tracking system can also employ one or more guidance mechanisms (e.g., audible, visual) to guide placement of a package into a holding area or to bring attention to the present location of a package (e.g., for purposes of removal).

Figure 1:
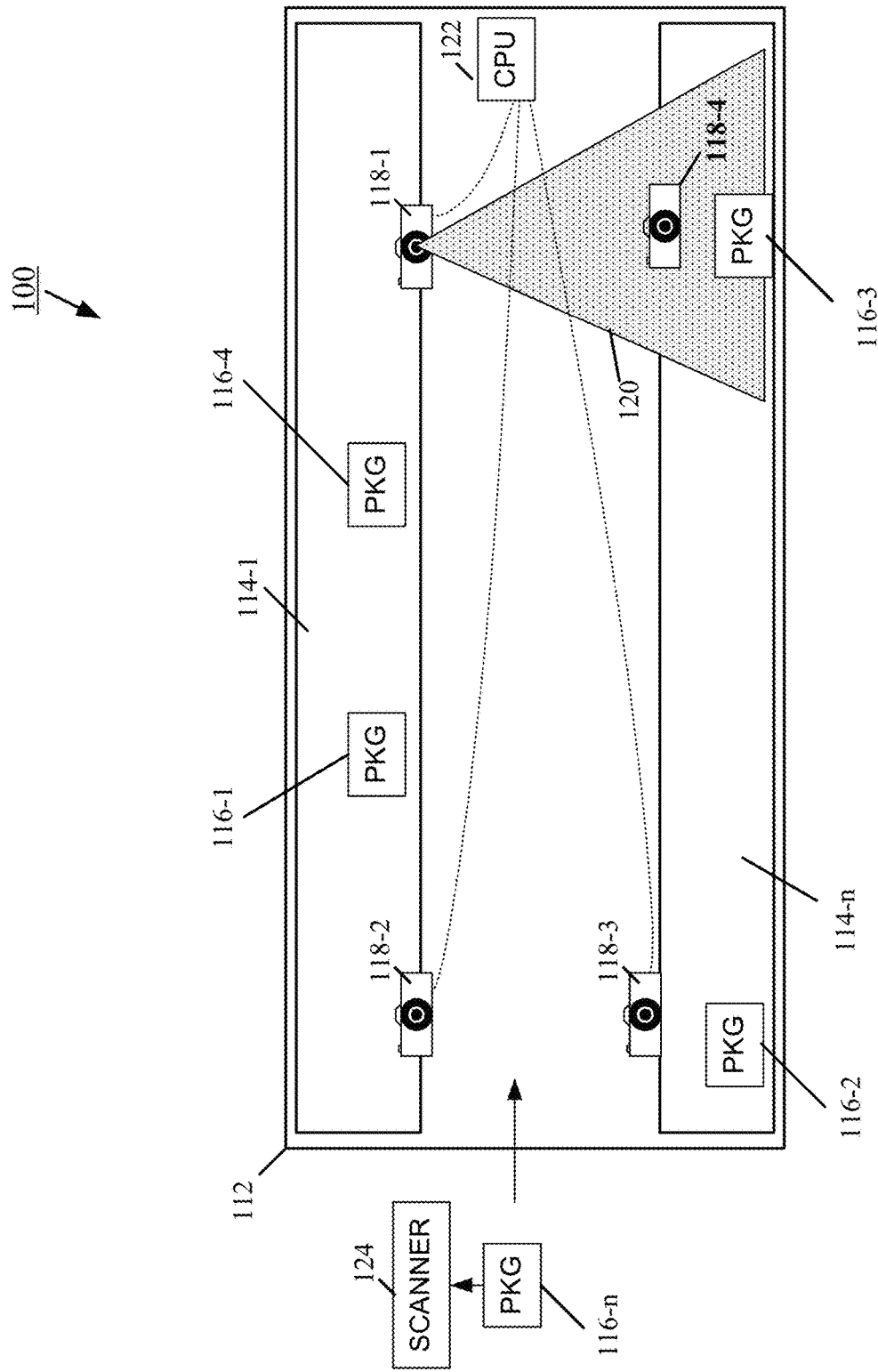
FIG. 1 is a view of an embodiment of a package tracking system.

FIG. 1 shows a view of one embodiment of a package tracking system 100 deployed in a tracking area 112. Example embodiments of the tracking area 112 include, but are not limited to, the cargo bay of a delivery truck or water-going vessel, a storage room, and a warehouse. For illustrative purposes, the tracking area 112 includes a plurality of shelves 114-1, 114-*n* (generally, shelf or shelves 114), and on the shelves 114 are packages and/or assets 116-1, 116-*n* (generally, package 116).

Shipper systems typically identify and track packages 116 using barcodes. A barcode is placed on a package 116 when the shipper takes possession of the package. The barcode includes package identification information about the package, including the package dimensions, identification number, delivery address, shipping route and other data. The term barcode is to be broadly understood herein to include images or markings on a package that contain information or data (coded or otherwise) pertaining to the package. The barcode on the package is initially scanned into the system 100 with a scanner 124.

In general, the scanner 124 may be optical, magnetic, or electromagnetic means, depending on the type of barcode on the package. The scanner 124 may be a conventional barcode scanner or a smart phone or tablet-like device. The form factor of the scanner 124 is not limiting. Example embodiments of the scanner 124 and techniques for wirelessly tracking the scanner 124 are described in U.S. patent application Ser. No. 14/568,468, filed Dec. 12, 2014, titled "Tracking System with Mobile Reader," the entirety of which is incorporated by reference herein.

The system 100 includes an optical system. In this embodiment, the optical system includes four optical sensors represented by cameras 118-1, 118-2, 118-3, and 118-4

(generally, camera 118). Each camera 118 has a field of view 120 covering a portion of the area within which the packages 116 lie (to simplify the illustration, only one field of view is shown). An appropriate number of cameras 118 can be mounted inside the tracking area 112 in such a way to provide a complete field of view, or at least a functionally sufficient field of view, of the area 112, and, in some cases, of an area outside the area 112 (e.g., a conveyor belt moving the packages prior to loading). Before the system 100 begins to operate, each camera position is fixed to ensure the camera(s) cover the tracking area 112. The exact position and number of cameras 118 is within the discretion of the system designer. The camera 118 may be a simple image or video capture camera in the visual range, an infrared light detection sensor, depth sensor, or other optical sensing approach. In general, this camera enables real-time package tracking when the package is within the camera's area of coverage. The area of coverage is preferably the shelves 114 and tracking area 112. In some instances, the field of view can extend beyond the tracking area 112, to ensure that the packages scanned outside the tracking area 112 correspond to those packages placed inside the tracking area 112.

In addition, each camera 118 is in communication with a processor 122 (CPU 122), for example, a DSP (digital signal processor) or a general processor of greater or lesser capability than a DSP. In one embodiment, the CPU 122 is a Raspberry Pi. Although shown as a single CPU within the tracking area 112, the processor 122 can be a processing system comprised of one or more processors inside the tracking area, outside of the tracking area, or a combination thereof. Communication between the cameras 118 and the CPU 122 is by way of a wired or wireless path or a combination thereof. The protocol for communicating images, the compression of image data (if desired), and the image quality required are within the scope of the designer.

In one embodiment, the cameras 118 are video cameras running in parallel, and the cameras simultaneously provide images to the CPU 122, which performs an image processing solution. For this approach, the images are merged into a pre-determined map or layout of the tracking area 112 and used like a panorama. (Alternatively, or additionally, the CPU 122 can merge the images into a mosaic, as described in more detail below). The camera images are synchronized to fit the map and operate as one camera with a panorama view. In this embodiment, two (or more) cameras capture two different perspectives and the CPU 122 flattens the images by removing perspective distortion in each of them and merges the resulting image into the pre-determined map.

An image stitching process usually first performs image alignment using algorithms that can discover the relationships among images with varying degrees of overlap. These algorithms are suited for applications such as video stabilization, summarization, and the creation of panoramic mosaics, which can be used in the images taken from the cameras 118 (i.e., optical sensors) in the described system.

After alignment is complete, image-stitching algorithms take the estimates produced by such algorithms and blend the images in a seamless manner, while taking care of potential problems, such as blurring or ghosting caused by parallax and scene movement as well as varying image exposures inside the environment at which the cameras are placed in. Example image stitching processes are described in "Image Alignment and Stitching: A Tutorial", by Richard Szeliski, Dec. 10, 2006, Technical Report, MSR-TR-2004-92, Microsoft Research; "Automatic Panoramic Image Stitching using Invariant Features," by Brown and D. Lowe, International Journal of Computer Vision, 74(1), pages 59-73, 2007; and "Performance Evaluation of Color Correction Approaches for Automatic Multiview Image and Video Stitching," by Wei Xu and Jane Mulligan, In Intl. Conf on Computer Vision and Pattern Recognition (CVPR10), San Francisco, CA, 2010, the teachings of which are incorporated by reference herein in their entireties.

In an alternative embodiment, a mosaic approach may be utilized to integrate camera images. In this embodiment, one camera 118 is used for a certain area, a second (or third or fourth) camera 118 is used for another area, and a handoff is used during the tracking, with the images from cameras 118 being run in parallel on the CPU 122. In a mosaic, like a panorama approach, image data from the multiple cameras (or from other sensors) are merged into the map of the tracking area 112 (e.g., truck, container, plane, etc.) with each viewpoint designated for the area that is seen by the camera 18. It will be recognized that in both embodiments, a handoff is made when objects move from one viewpoint to another or are seen by one camera and not the others. These handoffs may be made using the images running in parallel on the cameras 118, with the package placement and movement determined by the CPU 122 using whichever camera has the best view of the package 116.

In an alternative embodiment, if the system 100 is using depth sensors, the image stitching operation can be omitted and each camera stream data is processed independently for change, object detection and recognition. Then, the result "areas of interest" are converted to individual point clouds (described further in connection with FIG. 6C) and transformed in to a single common coordinate system. The translation and rotation transformations used for this process are based on the camera sensors position and orientation in relations with each other. One camera is picked as the main sensor and all other camera data is transformed into the main coordinate system, achieving the same end result as the image stitching procedure, namely, unification of package coordinates between sensors.

In one embodiment, the image processing is performed by the CPU 122. Alternatively, if bandwidth is not a significant concern, the image data can be transferred to a central server (FIG. 2) and image processing may be performed by the central server. Those of ordinary skill in the art will recognize that any controller, CPU, graphics processor or other computing device capable of processing image data to perform the image analysis described herein may be utilized.

The image processing CPU 122 creates the aforementioned map of the tracking area 112 under surveillance. Locating the shelves 114 assists the image processor 112 identification edge locations of packages 116. Further, a priori calculation of the distance of each camera 18 from shelves 114 assists in properly calculating package dimensions. In one embodiment, a single reference dimension is needed and dimensions of a tracked asset 116 can be determined at any position in space relative to the known dimension. In case of image or video cameras only, a dimension reference has to be related to position in the tracking area 112 (i.e., the length and depth of the shelves are known, thus the dimensions of a package placed on these shelves can be determined in relation with these shelves). In this embodiment, pixel count or vector distances of contours of these pixels can represent the package 116 and be used to help determine relevant package dimension data.

Figure 2:
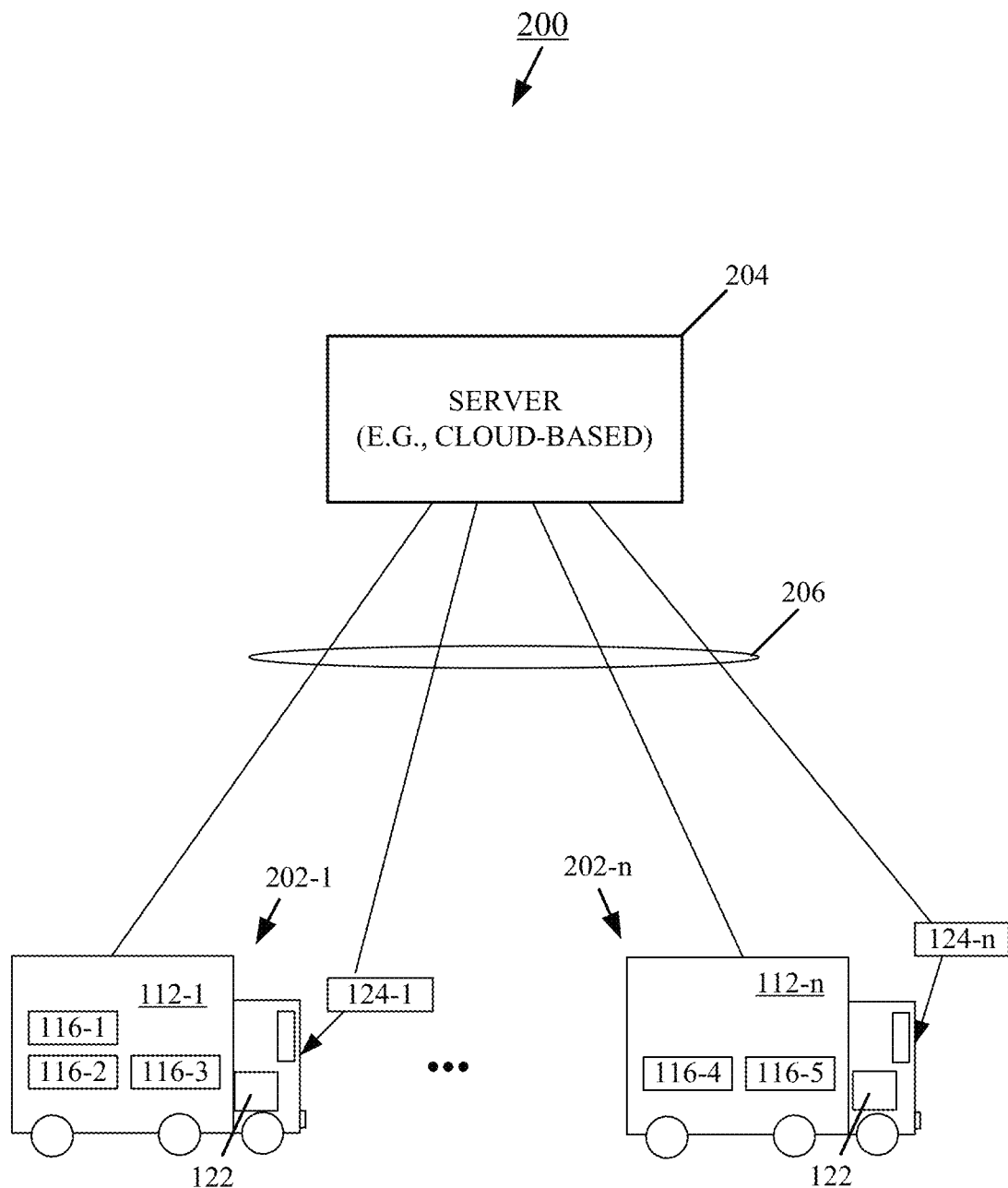
FIG. 2 is a diagram of an example implementation of the package tracking system within a delivery system.

FIG. 2 shows an example of an implementation of the package tracking system 100 (FIG. 1) within a delivery system 200. For illustration purposes, the delivery system 200 includes multiple delivery vehicles 202-1, 202-n (generally, 202) and scanners 124-1, 124-n (generally, 124) used by personnel to obtain package identification information from packages. Although shown in FIG. 2 as trucks, a delivery vehicle 202 may be any form of transport, including, but not limited to, an airplane, automobile, van, seagoing vessel, train, airplane baggage cart. The delivery vehicles 202 and scanners 124 are in communication with a central server (or servers) 204 over communication connections 206. The server 204 (or servers) can be cloud based, meaning that a provider of the server 204 makes applications, services, and resources available on demand to users over a network (e.g., the Internet). The communication connections 206 may be established using any type of communication system including, but not limited to, a cellular network, private network, local network, wired network, wireless network, or any combination thereof.

The scanners 124 are in communication with the central server 204, either continuously or through data dumps, to transfer package identification information when a barcode on a package is scanned and the location. Typically, the location of the scanner 124 is generic (e.g., "Atlanta").

Each delivery vehicle 202 includes a tracking area 112, containing packages 116, and a processor 122. Each delivery vehicle 202 may have a GPS system (FIG. 7) for use in directing and tracking the vehicle 202. The cloud-based server 204 (or a central controller, not shown) identifies the appropriate shipping route, and the next appropriate delivery vehicle, if any. The delivery vehicles 202 may also communicate data (e.g., package identification information) to the central server 204. The transfer of data between the vehicles 202 and the central server 204, like the scanners, can be continuous or intermittent (e.g., data dumps). Based on such communications, the central server 204 not only can track the delivery vehicles 202, but also the progress of the packages 116 they carry through the shipping route. The central server 204 can use the package identification information to notify the driver of the next appropriate delivery vehicle, through the scanner of the driver, to expect the package.

Figure 3:
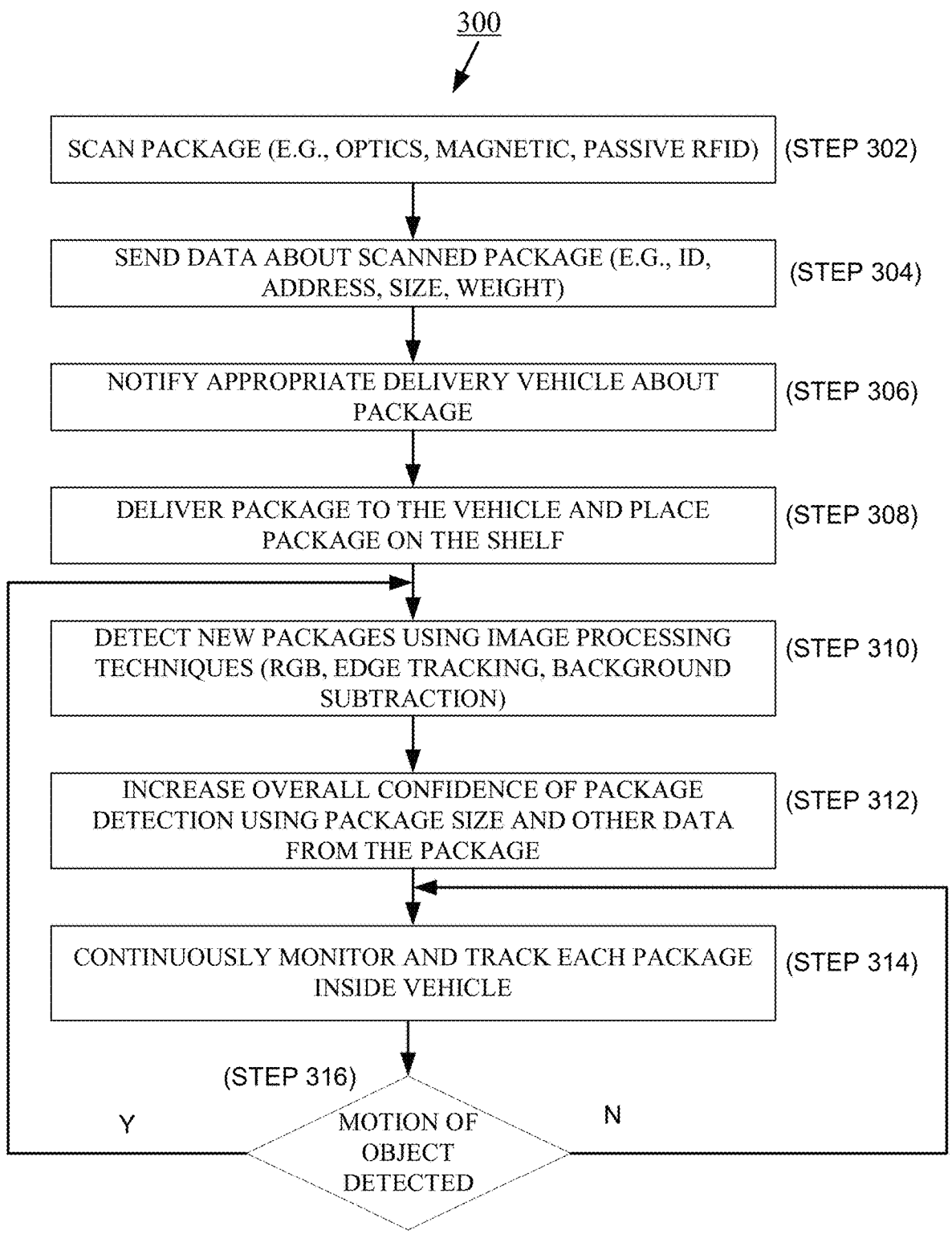
FIG. 3 is a flow diagram of an embodiment of a process for general package tracking.

FIG. 3 shows an embodiment of a process 300 for general package tracking. For purposes of illustrating the process 300 by example, reference is made to the delivery vehicle 202-1 and other elements of FIG. 2. Before loading a package 116-1 onto the delivery vehicle 202-1, a loader uses a scanner 124-1 to scan (step 302) a barcode associated with the package 116-1. The scanner 124 transmits (step 304) the barcode (package identification) information to the image processing CPU 122 of the delivery vehicle 202-1 or to the central server 204, which can then transmit the data to the CPU 122. Transmission of this information may be by Bluetooth, WIFI or other communication protocols, wired or wireless. By receiving the barcode information (e.g., identification number, size, color) describing the package 116-1, the image processing CPU 122 becomes notified (step 306) of the package 116-1 and expects this package 116-1 to be subsequently loaded onto the delivery vehicle 202-1. A loader places (step 308) the package 116-1 on a shelf of the vehicle 202-1. Light-based guidance may be used to direct the loader to the particular vehicle 202-1 upon which to load the package, the particular location on the shelf where to place the package 116-1, or both.

The image processing CPU 122 detects (step 310) the presence of the package 116-1, as described in more detail in connection with FIG. 5. The image processing CPU 122 then attempts to identify (step 312) the detected package as that package expected to be loaded (i.e., from step 306). Identifying the package 116-1 generally entails comparing certain visible characteristics of the package 116-1 to certain barcode information obtained during the scanning operation. In one embodiment, the size of the package measured using the camera(s) 118 of the delivery vehicle 202-1 is compared to the expected package dimensions as read from the barcode. In another embodiment, the image processor 122 registers the package 116-1 by virtue of the package 116-1 being the first package detected after notification (at step 306) of the package 116-1 being scanned. In such an instance, the image processor 122 can register the package 116-1 by associating image data captured by the camera(s) with the identification number read from the barcode of the detected package 116-1.

Figure 4A:
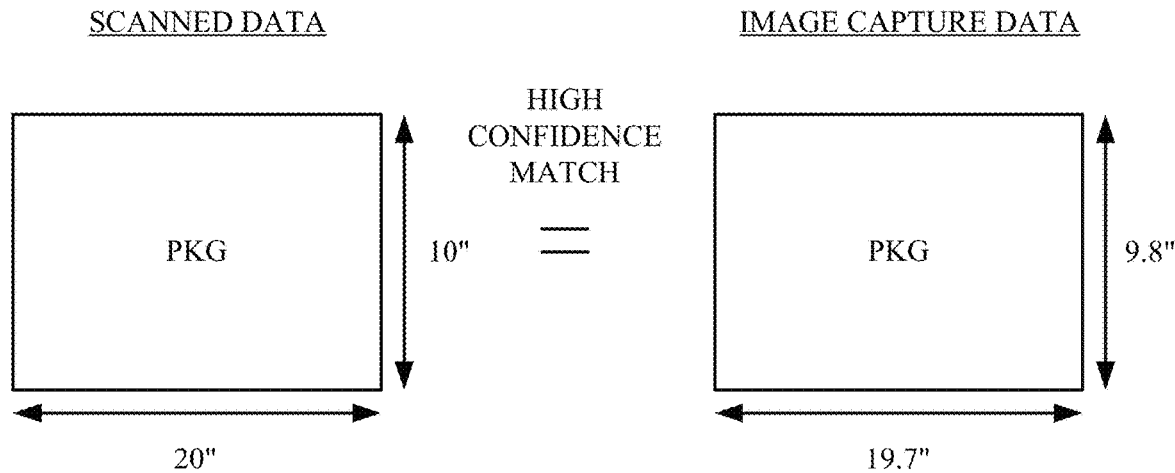
FIG. 4A is a diagram illustrating an example of a match between a detected package and a scanned package.

FIG. 4A shows an example of when such a comparison produces a match, thereby signifying a high level of confidence that the appropriate package was loaded on the delivery vehicle 202-1. In this example, the scanned barcode data identify the package 116-1 to be loaded as having package dimensions of 10" by 20". The images captured by the camera(s) 118 on the delivery vehicle 202-1 indicate that a package with dimensions of 9.8" by 19.7" was loaded on the delivery vehicle 202-1. The image processing CPU 122 is configured to consider the differences between the dimensions of the captured images and the dimensions according to the barcode data to fall within acceptable criteria for declaring a match.

Figure 4B:
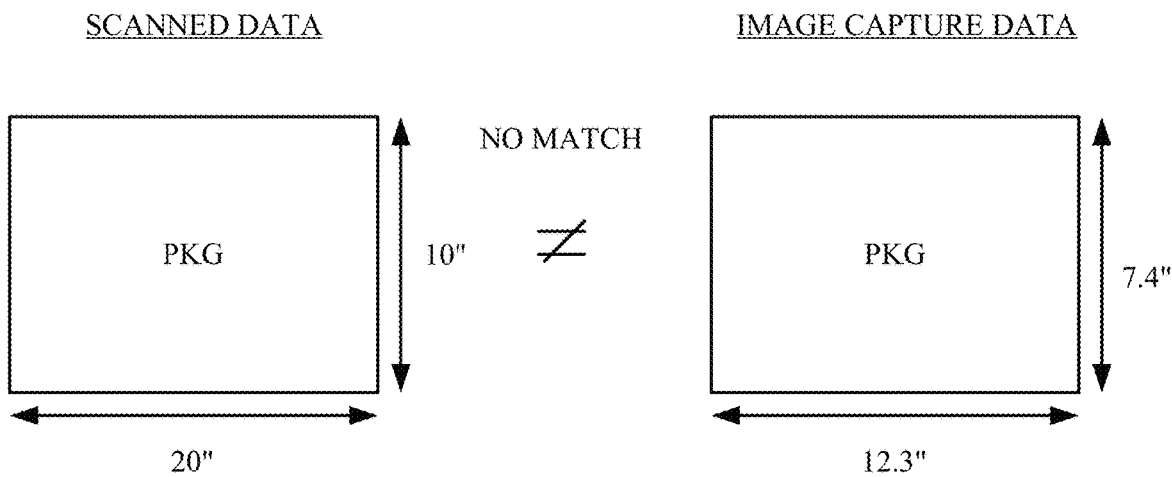
FIG. 4B is a diagram illustrating an example of a mismatch between a detected package and a scanned package.

FIG. 4B shows an example of when a comparison does not produce a match. In this example, a 10" by 20" package is scanned, but subsequent image capture data shows that a 7.4" by 12.3" package was loaded onto the delivery vehicle 202-1. The image processing CPU 122 can be configured to consider the differences between the dimensions to be too great to consider the detected package as a match to the scanned package.

Referring back to FIG. 3, if the data captured by the barcode scanner matches (within a predetermined threshold) the package image data captured by the camera 118, a match occurs. The matched package is not only marked or identified in real time as being within the delivery vehicle 202-1, but also the exact location of the package 116-1 in the vehicle may be made continuously available to the central server 204, loader, driver or anyone else with access to the system 200. This information, which may be referred to hereafter as package location data, can be stored on memory associated with the image processing CPU 122. Package location data includes the dimension information detected for the matched package associated with the location of the package within the delivery vehicle 202-1. More specifically, the image processing CPU 122 may overlay the initially created vehicle map with the package identification information in the corresponding location. If communications allow, marked package location data may be stored in memory at other locations, including (or additionally) in the central server 204.

As stated previously, the image processing CPU 122 includes wireless communication (commonly Bluetooth, Wi-Fi, or other communication methods and protocols suitable for the size of the area of coverage of the camera). The image processing CPU 122 continuously receives (step 314) real-time views captured by the cameras 118 in the delivery vehicle 202-1. Because the location of the matched package is stored in memory of the image processing CPU, the real-time image data from the camera 118 is streamed to a handheld or fixed or mounted view screen to show the live view of the package overlaid with augmented reality markings identifying the package. The image processing CPU 122 continuously monitors and tracks (step 314) within the vehicle 202-1 until motion of an object is detected (step 316). In response to the detection of motion, the process 300 returns to detecting packages at step 310.

Implications of such real-time tracking can be appreciated by the following illustration. A driver entering the delivery vehicle 202-1 may not and need not have any personal knowledge of what packages were loaded where in the vehicle. Instead, the driver carries a view screen (often in the form of a handheld tablet, smartphone, or scanner) that displays a stream of one of the cameras 118 in the cargo bay of the vehicle 202-1. The image appearing on the view screen includes marks identifying various packages. A mark may be a box around the live view of the package with text stating the package name, identifier, intended addressee or most efficient package identifier. Upon arriving at a stop for an intended package addressee, for example Mr. Jones, the driver can walk to the back of the delivery vehicle. The system 200 may automatically display the package(s) intended for delivery to Mr. Jones using highlighting or demarcating for easy location. Alternatively, the driver can search the image data on the view screen for markings labeled "Jones" and such packages are be demarcated on the view screen for easy location. In addition, the system 200 may employ light-based guidance to show the driver the location of the package.

In some embodiments, multiple live streams of the cargo in a vehicle are available, with one camera (e.g., 118-1 of FIG. 1) covering one area of the cargo bay and another camera (e.g., 118-2 of FIG. 2) covering another area of the cargo bay. The system 200 can thus quickly and effectively permit a loader or delivery person who enters the cargo area to locate a package using the camera stream overlaid with package marking (location). For a person using a tablet viewing the cargo area, the "video stream" in one embodiment can be a static image of the delivery vehicle sent from the image processing CPU. Since the central map of the delivery vehicle can be used for positioning the packages, that central map, with the location of each package of interest, is what is used for viewing on a device.

Figure 5:
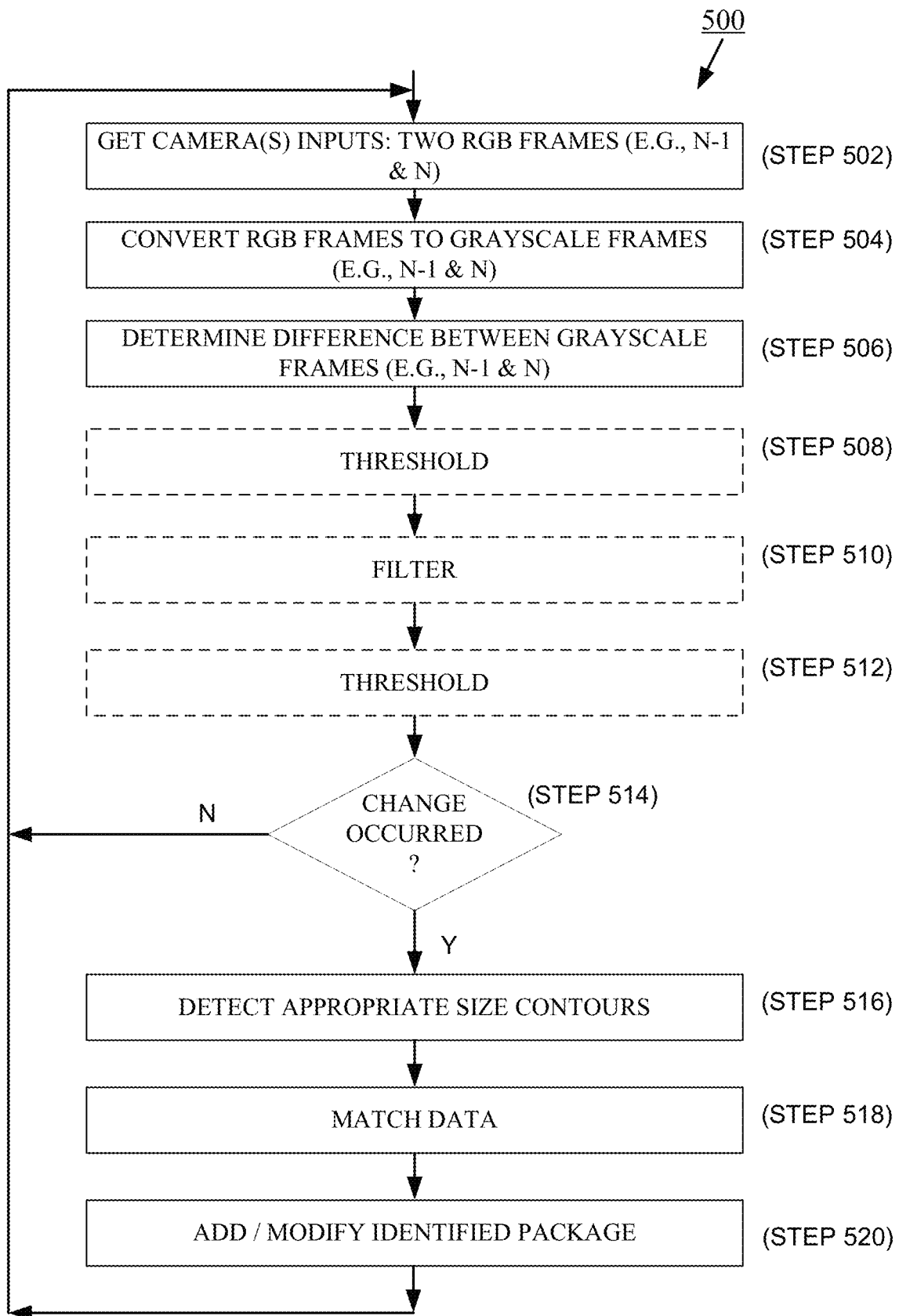
FIG. 5 is a flow diagram of an embodiment of an image-processing process for identifying and matching a package.

FIG. 5 shows an embodiment of an image-processing process 500 for identifying and matching a package. In a description of the process 500, reference is made to elements of FIG. 1. At step 502, color data (e.g., RGB) for at least two image frames (N and N−1) are acquired from a camera 118. The color data is converted (step 504) to grey scale data for the at least two image frames. Those of ordinary skill in the art are familiar with producing grey scale data from color image sensors.

At step 506, an absolute difference is determined across the two images to detect the presence of new objects. To quicken the processing, threshold detection (step 508) may be utilized to detect regions of interest. In addition, in those regions of interest data may be filtered (step 510) to limit the amount of data processed. After filtering, threshold detection (step 512) may be utilized on the filtered data.

At step 514, if no changes between the grayscale images are found, this indicates a high probability of no new package being located; the system 100 does not identify or mark a package. For instance, the loader may not have moved or loaded a package, or a new package cannot be located. The system 100 then acquires (step 502) the next temporal two frames (N and N+1). Sampling frequency may be continuous or at regular intervals according to designer preference, available processing power, and bandwidth.

If a change in the images (N and N−1) is detected at step 514, further analysis occurs. For example, the change detected by the system 100 may be the detection of the presence of the loader in the image. Alternatively, if changes in the images are indicative of a package moving, the image processing CPU 122 also continues to work on the current image data (frame N and N−1).

Those of ordinary skill in the art will recognize that a variety of images may be compared to determine loading or movement of a package. For example, an N 'current frame' and N-X 'previous frame' may be tested for motion, where X is greater than 1, and if motion occurs then the N-X frame (before motion occurred) may be saved as a background frame for later processing in comparison to a more recent image frame (i.e., a new N 'current frame'). After motion is stopped, the background frame and a new N current frame are used for package location and identification.

Whenever a new package is located, the package is to be identified. In one embodiment, the image processing CPU 122 uses edge detection to determine (step 516) the dimensions of the package. Objects that are not compatible with being a package are filtered at this point. For example, if an object size is less than the smallest possible package, the object is ignored. The system 100 can also filter other objects of a size, dimension, or location that do not correspond to a package (e.g., the loader or a clipboard or tablet carried by the loader).

Various metrics may be utilized in addition to or conjunction with those described above to aid in identifying a package. For example, any object placed on a shelf (mapped as described above) may be weighted logically so as to be presumed to be the last scanned package. The package size, color (if cameras are color), contours or other distinguishing characteristics may be compared to any data captured by the barcode scanner. As previously described, when a package barcode is scanned, the system 100 expects that the next package detected will match the scanned package. Reliance on this assumption is accurate provided loaders handle packages sequentially, that is, a barcode of a package is scanned and then that package is sorted and moved appropriately. This a priori knowledge facilitates package identification.

At step 518, the package dimensions are used to match the package to the scanned barcode data, as described previously in connection with FIG. 3. The size of a package as determined from image data is compared to the predicted package size based on barcode-scanned data to determine a package match. If the match occurs, the system 100 marks (step 520) the loaded package as identified as described in more detail below. The system 100 provides a cue to anyone entering the cargo area of a delivery vehicle as to the location and identification of packages kept within.

In addition to view screens, other package location identification methods can be used to improve the locating process. For example, as a vehicle arrives at the destination address for the delivery of a certain package, a light projector (LED, laser or other) can be used to shine focused light, or a particular color light, on the location of the package within the cargo area to show the delivery person exactly where the "matched" package is in the vehicle. The focused light can be altered to change colors, blink, flash, or shine a pattern to signal additional information to the delivery person, for example, priorities of delivery and warnings of weight, or to signify that the package of interest is behind or under another package. Information is directly overlaid on the package that to be picked up, without needing any other screen or sound interface that might consume time to read or hear and consequently prolong the delivery process.

The above discussion assumes that a package that is scanned is relatively quickly matched to a package placed in the delivery vehicle. However, there may be instances where no match occurs or where a delay in matching occurs. This may occur if the package is loaded on the wrong truck, the driver scans one package but loads a different package, the driver tosses a package into the truck but not within video coverage (e.g., the package is occluded from view) or the driver's body occludes video coverage of a package.

In such situations, an embodiment of the system 100 requires a deliverable (i.e., a particular outcome) after a package is scanned. For example, if no package is detected that matches the scanned package, the system 100 may disallow further packages from being scanned, the system 100 may mark the package as scanned but unidentified, issue a warning to the loader, notify a central server of an unidentified package, or any combination thereof. The system designer may choose how rigidly to require package identification and processing (i.e., no further scanning until the package is appropriately tracked or just marking the package as scanned but with an unconfirmed loading status).

In some situations, a package may be loaded without having been scanned. This may be a loader error, where the loader places the package on the wrong truck, or may be intentional as in the case of theft. In these situations, the image processing CPU 122 still recognizes the existence of a loaded package, but there will be no "match" of the loaded package to a scanned package. Such a package may be "marked" in image streams as "unidentified", instead of with data identifying the package, and the system may issue a "warning" to the loader (visual/auditory or other) that an unidentified package is in the vehicle. The warnings may allow the loader (or driver) to correct the issue by scanning the package, placing the package in the camera view and producing an appropriately matched package. Alternatively, the system 100 may be constructed to disallow further scanning of packages if such errors occur, may issue warnings, may send the errors to the central server, or any combination thereof. In one example of an unidentified package being loaded into a delivery vehicle, the driver upon first entering the delivery vehicle may receive a notice that 300 packages have been loaded in the vehicle, but that one of the packages is "unidentified". The driver's tablet can show the location of the unidentified package, and remedial action may be suggested to, or required from, the driver. Alternatively, a distinct light (i.e., red light) may be directed onto the location where the unidentified package rests.

Detection of a package may be delayed or inhibited by occlusion of the field of view (such as the loader's body or another package). Through prediction from threshold detection from the loader position inside the vehicle cargo area and the vehicle cargo area map already stored by CPU 122, the system 100 can compare the known map of the vehicle cargo space before the loader enters with a package with the new map of the vehicle cargo space after the loader places a package in the cargo area to determine the location of the package. Thus, even if the loader's body temporarily occludes optical tracking as the package is placed inside the cargo area, the package can be located, identified, and matched by using image frames after the loader leaves the cargo area to frames before the loader entered the cargo area.

In one embodiment, the system 100 performs the process 500 to track packages continuously after they have been scanned, loaded, and "matched". The process 500 enables tracking of matched packages within an area of coverage after a package has been identified ("marked"). Specifically, after a package is loaded and marked in one place, the image processing CPU 122 can regularly (or continuously) perform the same (or similar) threshold detection to search for a "change" at the location of interest. This accounts for object movement during transport.

In this scenario, the system 100 has identified packages within the area of coverage and no new packages have been scanned. This may represent when the driver is driving the vehicle to a destination. If the image processing CPU 122 detects a change at or near a package location, a tracking subroutine is invoked. The detection of a change may comprise an image absolute difference comparison between frames as previously described with respect to detailed image processing. The processor 122 analyzes the location of the package within the image at which the change occurred and determines if the package at that location still matches the data for the package captured off the barcode. If the match is identical, the system 100 may continue to label the package as corresponding to the package scanned and placed at that location.

If, however, no package is detected at the location or if the package dimensions do not match the expected package dimensions with a high level of confidence, the image processor 122 searches for an "unidentified" package that matches the moved package dimensions. When the matching package is located, its overlay marking on the cargo system is updated to display the new package location.

The above ability to identify movement of previously located packages is particularly valuable in delivery vehicles. Drivers often shift packages forward in the vehicle during the delivery day to make packages accessible. By monitoring known package locations and tracking the movement of a package to a new location, the system 100 maintains a real time map of package locations.

In another embodiment, the system 100 can be configured to reduce potential human loading errors that occur from a breakdown of a sequential loading pattern of scanning a package then loading that package immediately into truck. This reduction may be achieved by, for example, providing additional scanners over the delivery vehicle loading doors to scan bar codes automatically as packages are placed into the vehicle. Such a system can guarantee that the packages scanned are the packages loaded into the truck. After a package is scanned, it is also viewed by the optical sensors in the vehicle; that direct and almost simultaneous registration improves package identification.

In another embodiment, the system 100 can alternatively provide continuous, real time tracking, albeit with more complicated image processing. In such a system, for example, a person (loader, driver, etc.) may be identified and the system may detect objects located in the vicinity of the hands of the person to determine if the object matches the package expected to be loaded. Further, an algorithm for identifying a package or its unique identifier (size, color, etc.) may be tailored to specific environments or hardware. The tradeoff of such a full real-time tracking system is increased system complexity.

In another embodiment of the system 100, an augmented reality ("AR") real time video view may be presented to the loader/driver. For AR video in real time, a single perspective is shown of the vehicle cargo map with those designated packages needing to be taken being highlighted or lit. The user may view one perspective of the vehicle from the front (or back, depending on how the user is removing the packages, that is, from either the front or from the back), one perspective of the left side of the vehicle and one perspective of the right side of the vehicle associated with each camera. The image processing CPU 122 may determine where the driver/delivery person is and provide a perspective on the tablet based on the driver position in relation to the package being delivered. As previously described, identifying the user position within the area of coverage is analogous to identifying a package.

Additional package delivery data may be gathered using the present system. For example, the system 100 may track package movement in real time. Therefore, tracking package movement, especially velocity, can help prevent mistreatment of packages through packages being thrown, dropped, or placed in positions that are not secure and risk having the packages fall. By tracking packages movement in real time and determining movement velocity, impact through rough handling can be monitored and reported to improve the quality of the loading and unloading procedures and to prevent damage to the packages. In this embodiment, velocity may be determined by dividing the distance a package moves by the frame rate in which such movement occurs.

Figure 6A:
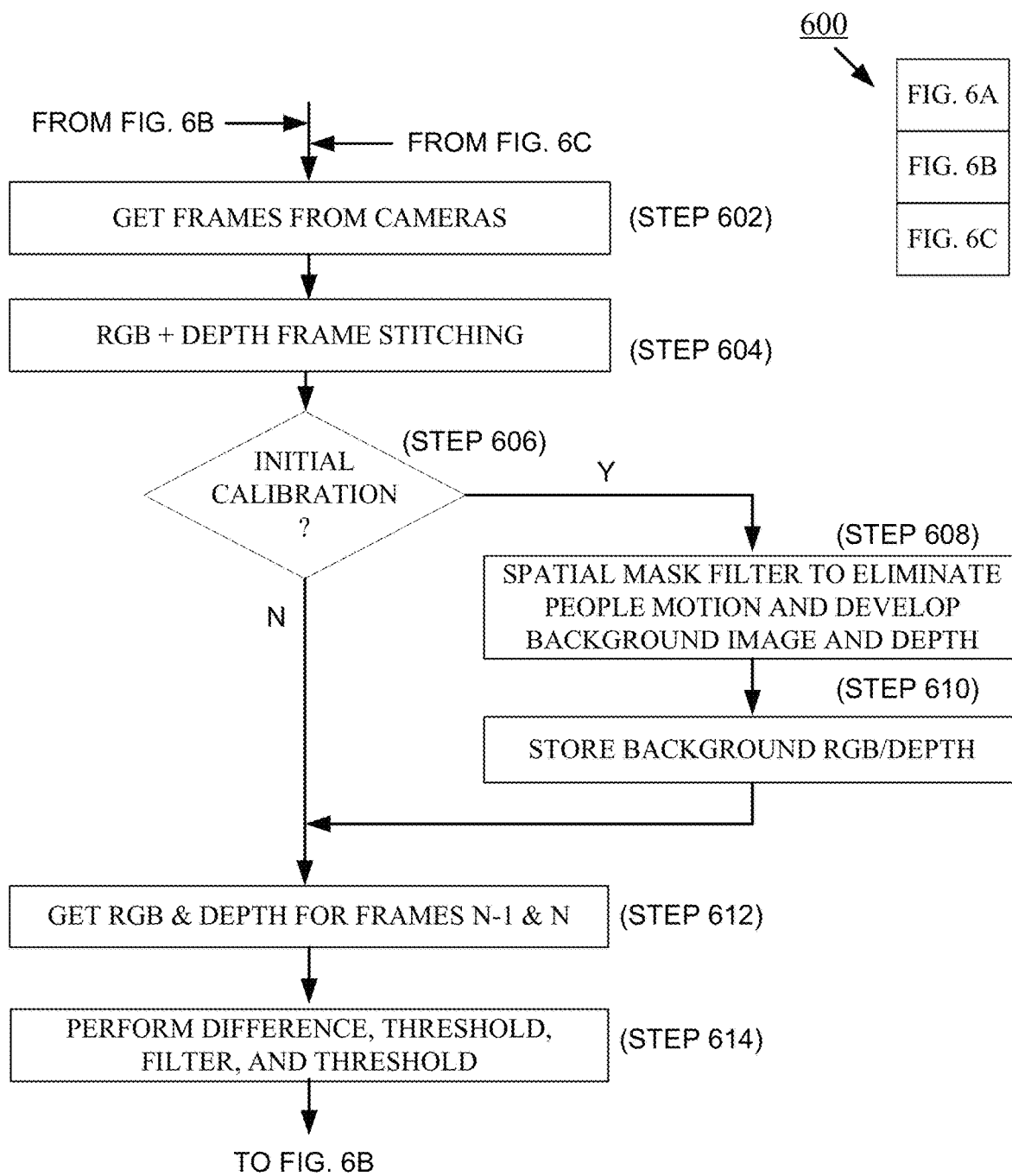
FIGS. 6A, 6B, and 6C together are a flow diagram of an embodiment of an image-processing process that uses depth information to track a package.
Figure 6B:
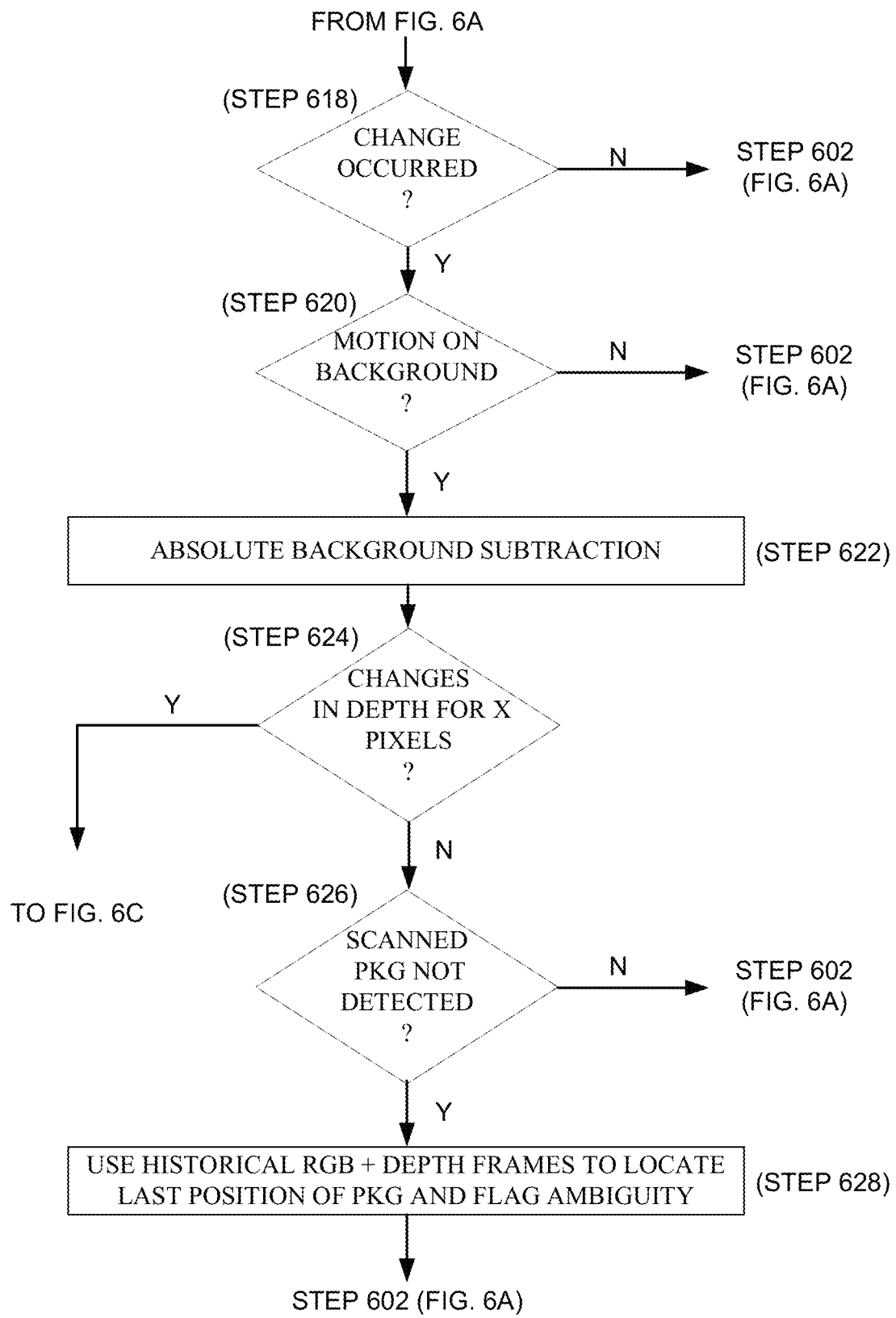
Figure 6C:
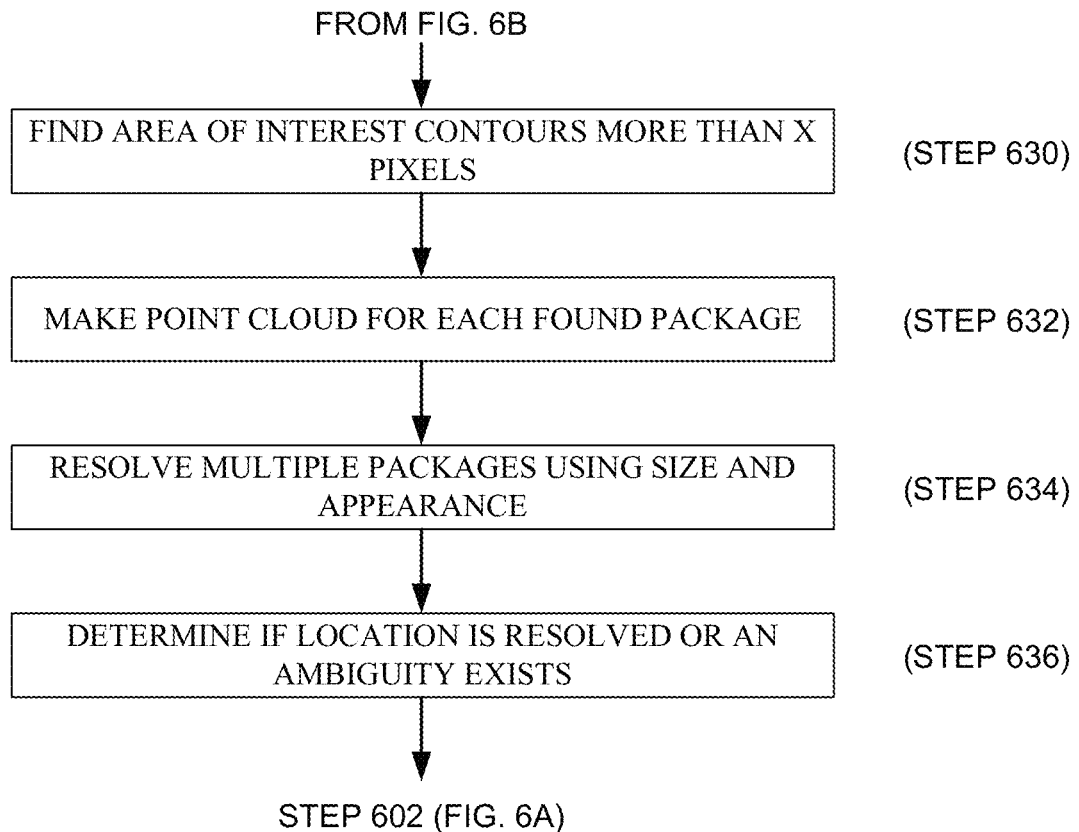

FIGS. 6A, 6B, and 6C together show an embodiment of an image-processing process 600 that uses optical information supplemented with depth information to track a package, product, or item. Specifically, as is familiar to one of ordinary skill in the art, a two-dimensional (2D) optical image capture device (i.e., a camera) with a single aperture is capable of capturing 2D image information on a plane (film, CCD, etc). To acquire three-dimensional (3D) information typically requires acquisition of additional data. Three-dimensional data can be acquired using multiple cameras or by combining one or more cameras with one or more depth sensors. Cameras can utilize visible light, infrared light, or other optical wavelength ranges. Depth sensors can be based on infrared, laser or other wavelength emitters that transmit light to an object, or to a portion of the object. Depth sensors typically determine the distance to the object, or to portion of the object, from the light that is reflected or backscattered from the object. Alternatively, depth sensors can utilize acoustic signals to determine distance. In one embodiment, depth sensing is integrated into the optical camera, for example, the KINECT™ K000949, although other devices can be used.

Referring to FIG. 6A, at step 602, frames are acquired from the camera system. A camera system with depth sensing capability typically outputs video (e.g., RGB, CYMG) and depth field information. Video may optionally be encoded to a well known format, such as MPEG. At step 604, the optical and depth information are stitched together. Open libraries such as OpenCV or OpenNI (used to capture depth images) enable the optical and depth information to be stitched together. Alternatively, a user may develop customized software for generating 3D information for object data generated by optical images and depth sensors.

At step 606, an initial calibration is performed if a calibration has not been previously performed. A function of this initial calibration, which is performed over multiple image frames, is to determine background information both for 2D optical images and depth sensing. Any motion (e.g., people) is extracted or ignored (step 608) during background extraction until stable background optical (RGB) and depth information can be stored (step 610). Calibration may optionally include creation of a foreground or front-ground region. This front region limits the data set for analysis to a region near shelves where objects of interest (e.g., packages) are to be located. Calibration may be performed on start-up, at intervals, be initiated by the user, or by the system, for example, if errors are detected.

After calibration is complete, the resulting spatial filter masks are used to extract the "area of interest." In one embodiment, this area of interest corresponds to the area between the background and the foreground, so everything that is not the wall and the shelves (for background) and not the person in front of the shelves, is ignored. This ignoring of the background and foreground focuses on data within the depth threshold of the area of interest being monitored. Alternatively, the "area of interest" can include a different part of the scene, for example, the foreground in order to see where the person is in later recognition steps and can be expanded or contracted as system requirements dictate. In general, the area of interest applies to any cut-out of a scene that is to be the focus within which to perform object tracking.

Multiple image frames (e.g., N–1 and N) are obtained (step 612) and compared (step 614), similarly to that performed in process 500 (FIG. 5), although the image frames in the process 600 include depth information in addition to RGB data. Image and depth information can be filtered for noise and then processed to determine if a difference between two frames exists. This can be done with edge detection, threshold and difference algorithms, or other image processing techniques. In the process 600, information from the depth sensor is also processed to compare image frames.

Referring to FIG. 6B, when no image change is found (step 618), that is, when depth and optical data remain substantially unchanged, the process 600 continues with the next temporal images received (e.g., N and N+1). When a change is detected, the process 600 determines (step 620) whether a "background" object has moved. If a background object has not moved, the process 600 continues with the next temporal images received (e.g., N and N+1). If a background object is determined to have moved, the system 100 does not have to consider a package for tracking, and further general tracking continues. In this instance, the system 100 may go back to the calibration step to establish a new stable background data set having 2D optical image and depth information.

In one embodiment, the process 600 compares two frames of image information for change, ignoring the background/foreground masks; any actual change in the image triggers further analysis. However, it is less processing and power intensive to detect only changes in the "area of interest" between the background and foreground (if foreground masking is utilized). When the background is stable, at step 622 absolute background subtraction is performed (likewise for foreground). This step allows the resulting 3D information to be processed faster for determining areas of interest in which one or more new packages may by present. Absolute image subtraction may be formed using OpenCV library modules in one embodiment, though other alternative techniques may also be used.

With the background information (and foreground if applicable) subtracted, the process 600 checks (step 624) for changes in depth of any objects in the field of view of the camera(s) and the measurement field of the depth sensor(s). If no changes are found and no package has been scanned (step 626), this indicates that no package has been detected and the next images are processed (step 602). However, if a package was scanned (step 626), but no package was detected, the process 600 can use (step 628) historical optical and depth information (or information from an adjacent wireless tracking system) to register that the last scanned package has not been located, indicate the last known location of the package, and inform the user of the ambiguity.

Referring now to FIG. 6C, if at step 624 a change in the depth of one or more objects has been detected, an area of interest around that region of change is generated (step 630). In one embodiment, an area of interest is generated using a software module from the OpenCV library, though other techniques may be employed. Typically, though not necessarily, the area of interest also includes movement information or vector information that indicates object motion.

When the area of interest is determined, a "point cloud" is generated (step 632) using the optic sensor(s) extrinsic and intrinsic parameters through algorithms for "2D to 3D" data representation conversion preformed on the RGB and/or depth images obtained and processed through OpenNI and OpenCV. In one embodiment, the Point Cloud Library may be used. The object shape and location information generated from the Point Cloud Library are used to identify and track a package in three dimensions using edge detection, color detection, object recognition and/or other algorithms for determining an object within the scene. If object information is in the shape of a human, for example, then the process 600 continues processing further image data and does not track the human (unless the system 100 tracks user motion). However, if the size, shape or other appearance information indicates that the object is a package, the object is recorded as such. The process 600 resolves (step 634) the identity of a plurality of scanned packages based on this information by comparing expected package size, shape and/or appearance attributes (as established by information associated with scanning a package) with measured information. The use of both optical and depth sensing information allows the system to calculate package size based on the 3D data generated from the camera images and depth sensor data. The identity, location and other information (e.g., time of placement and motion) may be stored at a central server (e.g., 204 of FIG. 2) for later analysis.

When an object is detected and matches a scanned package in size and appearance, the object is registered. A variety of reasons exist for a detected object not to match a scanned package. For example, the object may be partially occluded or a different object may have been substituted. In some instances, further analysis on subsequent image frames is performed to resolve the object size and appearance. In such instances, further image processing occurs until the object is identified or marked unidentified (step 636).

The aforementioned description of the process 600 is with respect to a positive change in an image scene: specifically, a new object is located. A "negative change" can also be detected in a similar fashion and occurs when a package is removed from an area of interest. In such a situation, a difference is not mistaking package occlusion as object removal. Specifically, if a person steps in front of a package, then the system detects the motion and shape of the person. After the person moves away from the front of the package, the image processor 122 detects if the identified package was removed. Note that the user typically scans a package when moving it, so taking a package from a location without scanning it may trigger a flag to the user to scan or identify the package.

In many situations, a second package may be placed so as to partially occlude a first registered package. In those instances, the system 100 looks for evidence based on depth and size information that the first package is still in its original location. Such evidence can be a corner of the package remaining visible behind the second package. If the first package is fully occluded, but not scanned to indicate its removal, then the system 100 may be designed to assume the first package is sitting behind the larger second package.

As previously described, the system 100 detects changes in a field of view to build a database of known packages. The database is used to locate and disregard these registered packages while looking for identifying new objects being placed into the field of view. While the registered packages are "disregarded" when looking for new packages that are being loaded, they are continually monitored to see if they have moved or been removed.

The process 600 may run continuously or be triggered upon user startup, detection of motion, or other triggers. Allowing the system 100 to drop to a lower state of analysis may be desirable in some instances to reduce bandwidth and power consumption. For example, if a delivery vehicle is being loaded, then the system 100 can run at full speed with processing of images at the maximum rate described by the camera. However, after loading is complete, the system 100 can operate at intervals (for example, by processing images once every 3 seconds) to conserve power, data storage and bandwidth while meeting the requirements of the specific application.

Augmented Package Loading Techniques

Package tracking systems described herein can track packages within conventional delivery systems wherein loaders place packages on vehicles according to their perception of proper loading protocols. This perception may vary by loader, region, delivery vehicle, or other factors. Such package tracking systems can also be configured to optimize package loading in addition to delivery. In one example, the central server 204 (FIG. 2) or image processor CPU 122 (FIG. 1) may keep a list of all packages intended for placement on a particular delivery vehicle. In this example, the package identification information for each package includes the intended addressee and package size information. The intended addressees are used to generate an order of delivery that may be used to place packages in a specific order in the delivery vehicle (e.g., packages to be delivered first are put in a position of easiest access). Package size may also be a factor affecting package loading. Heavy or large packages can be located on the floor or an appropriate (i.e., low) shelf, irrespective of the delivery order.

In one embodiment, when the loader scans a package and enters the delivery vehicle with the package, the CPU 122 activates a light that shines on the location for that package. The location and matching of the package may be confirmed as previously described. A focused light may be used to identify the proper loading place for the package. The source of the light can be the same light as that used to identify a package for a driver.

In the various embodiments detailed herein, the location of a package may be "marked" or indicated in a variety of manners: by projecting light on the package of interest (unidentified package, package to be delivered, etc.), by projecting light where the package is to be loaded, by marking the position of the package on a live camera feed of the cargo bay, in a representational view of the cargo bay with the package location identified, or in a projection of the marking in augmented reality glasses. For example, consider an embodiment of a package tracking system wherein one or more shelves in a package room have a strip of lights along the front edge of that shelf. The package tracking system can be configured to illuminate a particular light in a given light strip to show the location on the shelving of a package to be removed or placed.

As an example of light-based guidance for package loading, consider a system that employs conveyor belts to move packages inside a facility. As the packages are transported on the conveyor belt they are scanned for identification, either by optical, magnetic, or electromagnetic means. After each package is identified, the system continually monitors the position of the package as it moves from one area of the facility to the end destination for transportation vehicle loading. As packages reach areas for vehicle loading, the system uses a form of light guidance to help loaders identify proper vehicle package assignment. For example, if a package is assigned to particular truck, that truck could be assigned a particular color, say blue. The package designated for the blue truck is then illuminated with a blue light, through LED, laser, or related light guidance means, thus making package vehicle identification easy for loaders. After the loader places the package in the identified delivery truck, the package tracking system can detect its presence and register its location as previously described.

One of ordinary skill in the art will recognize that other cues (visual, auditory or the like) using various technologies may be used to mark package location for easy loading, delivery or tracking of packages.

Augmented Tracking

Various embodiments of the package tracking systems described herein may benefit from additional tracking technology. For example, in the bigger areas (e.g., freight, air cargo, large shipping containers), one may incorporate other techniques to make tracking more interactive, such as Ultra-wideband (UWB) or Wireless Lan (including, but not limited to, 802.11 protocol communications or the like). Example implementations of techniques for tracking can be found in U.S. patent application Ser. No. 14/614,734, filed Feb. 5, 2015, titled "Virtual Reality and Augmented Reality Functionality for Mobile Devices," the entirety of which is hereby incorporated by reference.

In a package tracking system that augments optical tracking with UWB tracking, the driver, the driver's tablet, the packages, or all of the above, are actively tracked as described in U.S. patent application Ser. No. 15/041,405, filed Feb. 11, 2016, titled "Accurate Geographic Tracking of Mobile Devices," the entirety of which is incorporated by reference herein. In one embodiment, the position of the driver's tablet is tracked so that the viewpoint from the tablet's camera associated with the tablet location and orientation is streamed to the tablet, with digital images overlaid onto the tablet's camera view, and is used for navigation or package identification. In this example, as the tablet camera views a stack of packages, the accurate tracking of the physical position and orientation of the tablet allows the system to overlay a digital image, for example, a flashing red light, on top of the package that is seen by the tablet camera. In this case, digital images are shown on the tablet camera view, not projected onto the actual package by an external light source.

Small delivery (and other delivery modes, like airfreight, cargo containers) may use of UWB or RF (radio frequency) to improve positional accuracy tracking for when and where packages are scanned. The packages may be tracked using UWB with tags on the packages until a handoff to the camera for optically tracking inside the delivery vehicle becomes possible. This is a benefit as it reduces or eliminates the need to do optical image processing in the delivery vehicle, but still provides package ID confirmation and tracking (which may then also be re-registered via dimension data inside the delivery vehicle by the cameras).

In addition, cumulative tracking methods (i.e., optics and UWB) help track the driver and packages. For example, in dark environments, large environments or in situations involving other issues with optical coverage, it may be preferable to use UWB or related RF-based tracking to identify initial package location, and to switch to optical scanning after package location is generally identified. In such situations, UWB tracking may augment or supplant optical tracking.

Also, in some situations, one may want to track the loader using a tag physically associated with that person. In such an environment, one may scan a package and then track the loader using UWB to make sure the package goes to the correct delivery vehicle (for instance, they may be loading multiple trucks) or, in other use cases, track the driver as the driver leaves the delivery vehicle to insure proper delivery drop off location. In the scenario where a driver is being tracked, the driver is tracked as he leaves the delivery vehicle with the GPS position known either on the delivery vehicle or on the driver. As the driver leaves the delivery vehicle, the driver is tracked and when the package is dropped off, the package is scanned and the position in relation to the delivery vehicle is recorded to show proof of delivery. As described in the aforementioned U.S. patent application Ser. No. 15/041,405, augmented reality (AR) glasses can be used to track a driver. In this scenario, the AR glasses are being tracked by a form of RF tracking, and the orientation and position of the driver may be determined by the glasses.

Example implementations of UWB or other wireless tracking systems are described disclosed in U.S. patent application Ser. No. 13/975,724, filed Aug. 26, 2013, titled "Radio Frequency Communication System", the entirety of which is incorporated by reference herein. Tracking may be implemented outside the delivery to confirm that a package that was scanned by glasses or a finger scanner is the same package that gets loaded into the delivery vehicle. In such scenarios, a loader scans the package off a conveyor belt, and the loader is tracked by the UWB system to ensure that the package scanned is the package placed in the truck or is at the proper loading area of the delivery vehicle. Thereafter, the optical tracking system tracks packages within the area of coverage.

Figure 7:
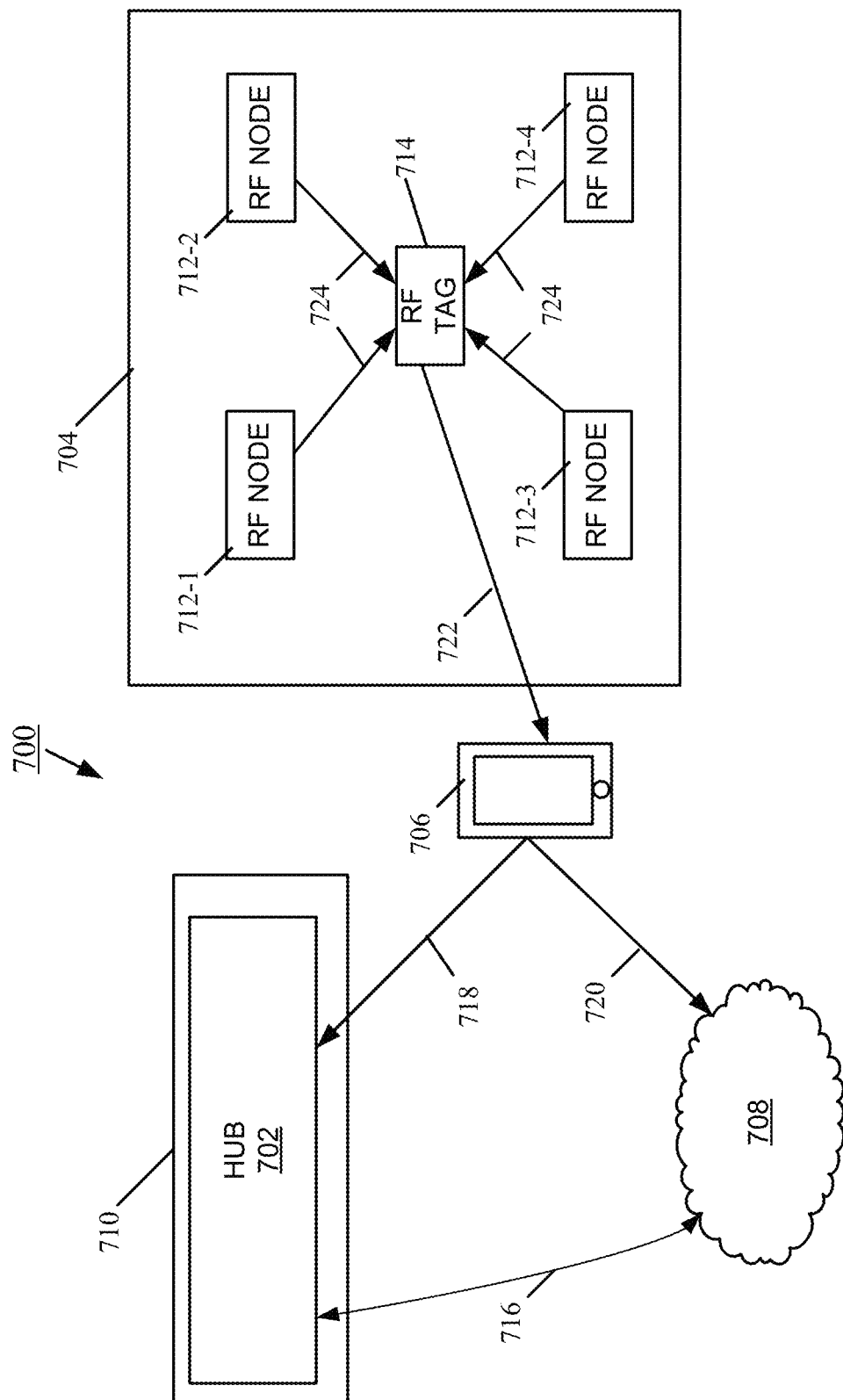
FIG. 7 is a diagram of embodiments of a package tracking system that uses radio frequency position determinations in conjunction with optical tracking.

FIG. 7 shows a diagram of an embodiment of a package tracking system 700 including an optical tracking hub 702 augmented with a radio frequency (RF) positioning system 704. The package tracking system 700 includes a user device 706 and a cloud-based central server system 708. The hub 702 is deployed in an area 710 used to hold packages, assets, objects, items, or the like, and is in communication with the cloud-based central server system 708 over a wireless communications channel (e.g., cellular) 716. Depending on the service provider for cellular PHY communications, if the holding area (e.g., delivery truck) is outside of the service area, the hub 702 buffers the data, package identification information, transactions, etc., until the holding area comes into range of a facility with secure Wi-Fi (i.e., provided, for example, by the package delivery company). For purposes of enabling customers to push or pull data from the cloud-based central server system 708, the hub provides a "Cloud" API (application program interface).

The RF positioning system 704 includes four RF nodes 712-1, 712-2, 712-3, and 712-4 (generally, 712) and an RF tag 714. The RF positioning system 704 operates to track the position of the RF tag 714, which can be affixed to the package or worn by personnel, such as a driver or package loader. In general, the RF nodes 712 provide an interface over Wi-Fi to the user device 706. The RF nodes 712 are in communication with the user device 706 via Wi-Fi, and the user device 706 is in communication with the hub 702 via Wi-Fi; in effect, the hub 702 provides an ad hoc Wi-Fi hotspot to the user device 706 and RF nodes 712.

The user device 706 is any computing device capable of running applications and wireless communications. Examples of the user device 706 include, but are not limited to, tablets and smart phones. The user device 706 can be in communication with the hub 702 over a wireless communications link 718, with the server system 708 over a wireless communications link 720, or both. An example implementation of the communication links 718, 720 is Wi-Fi.

The area 710 for holding assets can be stationary or mobile. A stationary holding area can be disposed anywhere along the delivery chain, from a warehouse to a package delivery center. Examples of stationary holding areas include, but are not limited to, package rooms, closets, warehouses, inventory rooms, storage rooms, and trailers. Examples of mobile holding areas include, but are not limited to, delivery trucks, tractor trailers, railway cars, shipping containers, and airplane cargo bays. Each holding area (i.e., each facility, truck, etc.) is equipped with an optical tracking hub 702. An example of a delivery truck than can be equipped with an optical tracking hub 702 is the standard Ford® P1000.

The RF tag 714 is in communication with the user device 706 over a wireless communication link 722, for example, Bluetooth, and with the RF nodes 712 by way of RF signals 724.

During operation, in general the hub 702 provides interior tracking (e.g., inside a delivery vehicle) of a package using optical techniques and the RF positioning system 704 provides exterior tracking (e.g., outside of the delivery vehicle) of the RF tag 714 using RF signals. In one embodiment, the user device 706 directly communicates with the server system 708 (e.g., in the cloud). In another embodiment, the user device 706 provides data to the hub 702, and the hub 702 communicates with the server system 708. In this embodiment, any feedback information from the server system 708 goes through the hub 702, which communicates such information to the user device 706 by Wi-Fi.

Figure 8:
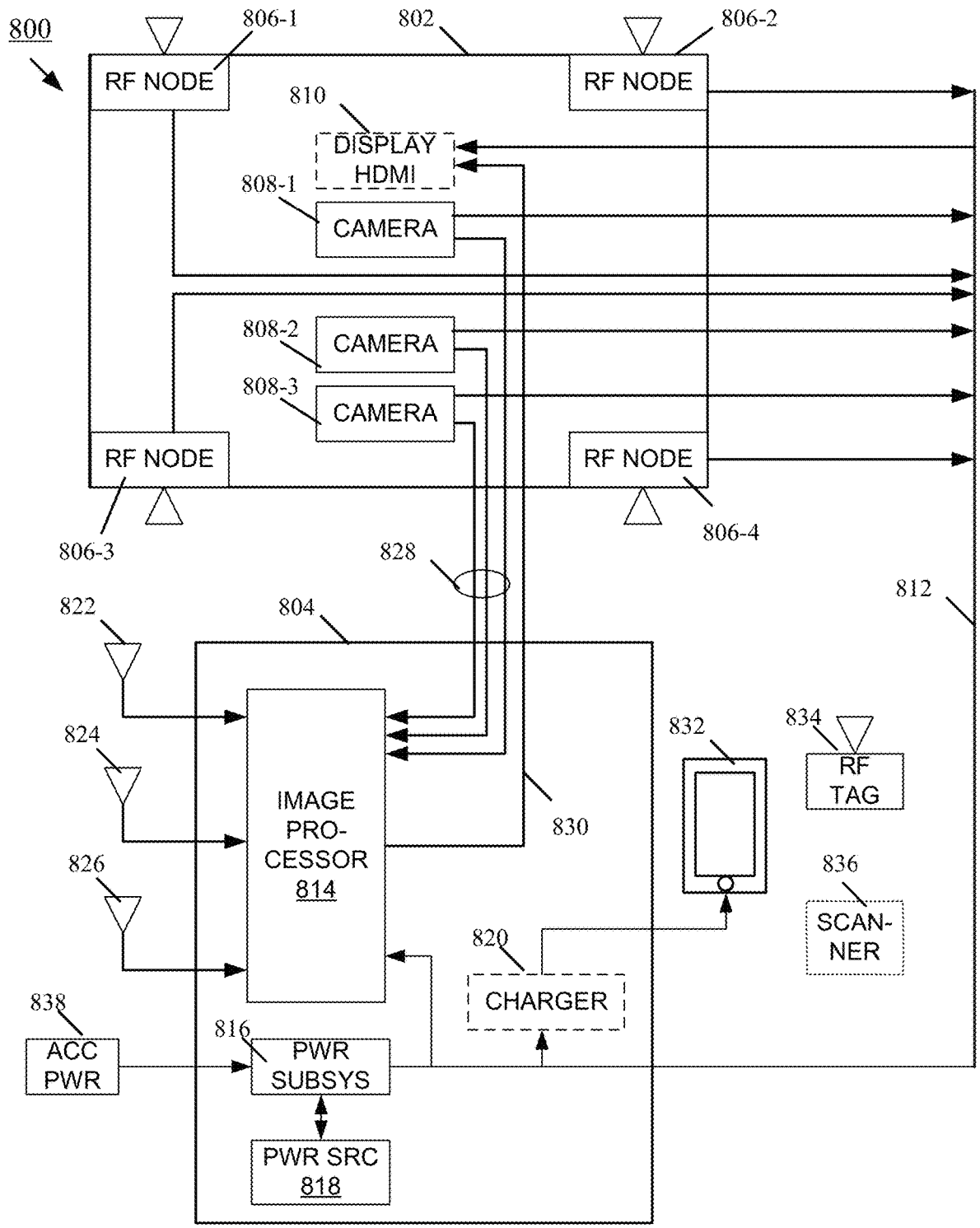
FIG. 8 is a schematic for an embodiment of a package tracking system.

FIG. 8 is a schematic for an embodiment of a package tracking system 800 including a holding area 802, configured for optical tracking and augmented with RF tracking, in communication with a hub and power subsystem 804, which may be referred to generally as a computing system. The holding area 802 includes four RF nodes 806-1, 806-2, 806-3, 806-4 (generally, 806) with antennae, three cameras (with depth sensors) 808-1, 808-2, 808-3 (generally, 808), and an optional monitor or display device 810 (e.g., an HDMI video display, with or without a speaker) to provide a visual status of the system 800. In one embodiment, the three cameras 808 are USB3-based. Each RF node 806, camera 808, and display device 810 is connected to a power bus 812 (e.g., a 12 VDC). The holding area 802 can also include a light projector (not shown) to shine focused light, or a particular color light, on the location within the area, to show personnel where a particular package can be currently found or where a particular package being loaded should be placed.

The hub and power subsystem 804 includes an image processor 814, a power subsystem 816 connected to a power source 818, and an optional charger 820. The power subsystem 816 provides power to the image processor 814 and charger 820 by the power bus 814. In one embodiment, the power source 818 is a battery (e.g., 12 VDC, 55 aH). An accessory power source 838 is connected to the power subsystem 816. In communication with the image processor 814 is a cellular antenna 822, a GPS antenna 824 and a Wi-Fi antenna 826. The image processor 814 is also in communication with the cameras 808 by communication links 828 and with the optional display device 810 by communication link 830. Also shown are the user device 832, RF tag 834, and scanner 836. The scanner 836 can be separate from the computing system that embodies the hub and power subsystem 804, as shown, or be integral to the computing system (e.g., a built-in barcode scanner). An optional light projector external to the holding area 802 (not shown) can be used to shine light on a package before the package is loaded, for purposes of guiding a loader to the location where the package is to be loaded (e.g., a particular delivery truck).

In one embodiment, the image processor 814 is implemented with a bCOM6-L1400 Express Module produced by General Electric of Fairfield, CT. The interfaces of the image processor 814 include: at least three USB3 ports for connecting to the cameras 808 and a USB2 port for connecting to an optional light-projector gimbal; an HDMI port for connecting to the display device 810; an integral GPS unit with the external GPS antenna; a cellular PHY card/interface (e.g., LTE, GSM, UMTS, CDMA or WCDMA, or WiMAX) with a cellular antenna jack (for an appropriate multiband cellular antenna operating at 800-950 MHz, 1800-1900, 1900-2000, 2100-2200 MHz bands, and can be a different physical antenna depending on the cellular PHY provider chosen for the given area) to enable a wireless connection to a cellular data service provider; and a Wi-Fi module with a Wi-Fi antenna jack (the antenna is omni-directional, providing 500 m of range, and operating over the 2400-2480 MHz range).

The holding area 802 can be stationary or mobile. For a mobile holding area 802, such as a delivery truck, the RF nodes 806 can be mounted externally on the roof of the cargo area at the four corners, with the cameras 808 and display device 810 mounted internally within the holding area 802. All of the cameras 808 are mounted near the ceiling of the truck box, facing towards the back of the truck, one camera at each front corner of the truck box, with the third camera at the front of the truck box disposed between the other two cameras. The cellular antenna 822 and Wi-Fi antenna 826 are mounted inside the truck and the GPS antenna 824 is mounted on the roof. In addition, a standard small form factor 2-axis gimbal can be mounted to the ceiling or rafter of the truck box. The gimbal provides azimuth (180 degree) and elevation angle (90 degree) positioning of the optional interior light projector (e.g., a laser pointer), which can be turned on and off. A USB2 interface of the image processor to a light projector sets the azimuth, elevation, and on/off state of the light.

The hub and power subsystem 804 can be placed within the cab of the truck, for example, behind the driver's seat. The system 800 is not attached directly to the vehicle DC power terminals, or directly to the battery of the vehicle, to avoid draining the battery of the delivery vehicle. Power subsystem 818 can connect to the accessory power 838 of the vehicle on a fuse. When the delivery vehicle is parked and off, the accessory power 838 is turned off, and the system 800 runs on the internal battery 818. The battery 818 thus ensures that when the delivery vehicle is off (such as during package loading) the various components of the system 800 remain powered. When the vehicle is idling or in motion, the system 800 charges the battery 818. The power subsystem 818 also provides 12 VDC and 5 VDC dedicated for the RF Nodes 806 and the cameras 808.

For a stationary holding area 802, the RF nodes 806 can be mounted externally near an entrance to the area 802, with the cameras 808 and display device 810 installed inside. The hub and power subsystem 804 can also be installed inside or outside of the holding area 802. For a stationary holding area 802, the cellular antenna 822 and GPS antenna 824 are optional.

A schematic diagram, as shown in FIG. 8, without the RF nodes 806 and RF tag 834, can illustrate an embodiment of a package tracking system that is not augmented with RF tracking.

People interact with package tracking systems described herein in a variety of ways, as carriers, couriers, store personnel, package room managers, and package recipients. Couriers and store personnel, for example, interact with a package tracking system when bringing (i.e., "dropping off") packages to a package room (a term used herein to refer generally to any area designated for holding packages, inclusive of conveyor belts). Whether a courier is bringing a package to a drop-off location, or a store clerk is carrying a customer-bought item to a designated holding area within a business enterprise, in each instance the person brings the package to a data acquisition site, where the person enters package identification information about the package being dropped off, for example, by scanning a bar code on the package, taking a picture of the shipping label and having character recognition software automatically recognize and input the package recipient information, or manually entering the recipient's information. This data acquisition site can be in the vicinity of or in the package room. Afterwards, the person places the package on a surface (e.g., shelf) in the package room, where the package tracking system detects placement of the package, and confirms (i.e., registers) whether the detected package corresponds to the package from which package identification information was last obtained.

In addition, couriers, package recipients, and "last mile" delivery personnel, for example, interact with a package tracking system when taking a package from the package room (i.e., referred to as "pick-up"). "Last mile" delivery personnel refers to a person, other than the intended package recipient, who is authorized to take a package from the package room and bring it one step closer to the package recipient. Such last mile delivery personnel may act as a courier and bring the package directly to the intended recipient or to a person authorized to take the package on behalf of the intended recipient. Alternatively, the last mile delivery personnel may drop off the package at another authorized designated holding area (where the package recipient or authorized individual can later pick up the package). Such authorized designated holding areas may or may not be configured with a package tracking system. Examples of designated holding areas include, but are not limited to, package rooms, locker rooms, vehicles, loading docks, warehouses, marked regions of open areas, closets, hallways, walls. At the designated holding area are surfaces for receiving the packages; such surfaces can be stationary, such as tabletops or shelves, or moving, such as a conveyor belt.

Many advantages derive from the use of cameras in the embodiments of package tracking systems described herein. Cameras strategically situated can capture images or take video during any stage of system operation: when a package arrives at a holding area; when a person enters information about the package into the system; when a person places the package in the holding area; while the package resides in the holding area; when a person comes to retrieve the package from the holding area; and when a person removes the package from the holding area. The holding area can be any designated area used for the placement of packages. These cameras may be active continuously or be turned on in response to the detection of the presence of the person, for example, by a motion detector.

The video taken by the cameras can serve to confirm package drop-off at a package room. For instance, when bringing a package to the package room, the person initially brings the package to a data acquisition site, for example, embodied by a kiosk. When the person scans the package to acquire the package identification information (or manually enters the information through a data input device), the package tracking system generates a record associated with the package. Video hereafter captured by an optical sensing device becomes associated with this package record. If the data acquisition site is outside of the package room, a camera positioned outside of the room captures the video, and the processor associates this video with the package. When the person then carries the package into the package room, a camera disposed within the package room captures the video of the person putting the package on a shelf. After the processor detects this package and determines it to be the one just scanned, the processor also associates this interior video with the package by making it part of the record. The record associated with this package includes two videos, a first video captured outside the package room and the second video capture on the inside, or one video comprised of the external and internal videos stitched together into one. Whether stitched together or kept separately, the package record that contains these videos (or links to them) provides visual confirmation that the package was indeed deposited in the package room. If, alternatively, the data acquisition site is within or part of the package room, the video captured by an appropriately positioned camera suffices to provide the visual confirmation of the package being registered and dropped off.

The captured images or video can serve to track each user's interactions with the system and to gather metrics (i.e., data) related to such interactions. Such metrics can provide a basis for issuing alerts, for example, in the event people are not properly interacting with the package tracking system in accordance to established procedure. The aggregate interactions of multiple users, tallied in the form of metrics, empirical data, or metadata, can serve to improve procedures for and interfaces to the package tracking system. Examples of such user interactions include, but are not limited to, the amount of time elapsed between when information about a package is entered into the system to when the package is brought to (dropped off at) a package room or picked up (retrieved) from the room; the amount of time elapsed between when a package is dropped off at a package room and retrieved from the room; the speed with which a person handles the package at the time of package pickup or package drop off; the movement of a package and of a person in the package room; and the time spent by a person in the package room or warehouse picking up or dropping off a package. Examples of procedural improvements based on collected data include improvements to package placement or placement sequence, improvements to retrieval procedures and protocols, and improvements to navigation to packages.

Because cameras can video all aspects of a user's interaction with the package tracking system and packages, the system can determine through a set of protocol events that a certain interaction is not following procedures or is occurring counter to interaction rules, such as throwing a package. Should an action be flagged as against rules, such as throwing packages, standing on packages or shelves, pushing packages too forcefully, and taking the wrong package, the system can issue an audible alert, for example, a voice command or alarm, or the system can notify building staff through electronic messaging that the system is being improperly used. Videos from this interaction can then be recorded for verification of the improper use, sent to security or appropriate building staff for viewing, or both, in real-time or at a later time.

Cameras and imaging can also be utilized to provide better user interface options and features. For example, when a package is received in the room, an electronic text message, email, or similar notification can be sent to the package recipient indicating that their package is in the package room. The notification can include an image of the package in the package room. This feature of notification with package images can assure the recipient that the package has arrived safely, provide proof of package safe handling and delivery, and help direct the recipient to the package through such visualization before the recipient even arrives at the package room.

This package imaging can also be used in transit during the loading and unloading of a package from a truck. Such images can serve to verify proper package handling, which reassures the intended recipient or serves as evidence for insurance companies or delivery companies in the event a claim is made on broken or damaged packages or personnel injuries. Truck and transit video recording can also be used to improve procedure efficiency as noted in the package room environment.

Video and tracking can also aid and guide delivery personnel and recipients on package lifting and placement should a package be heavy. Heavy or awkwardly shaped packages can be flagged, and the cameras can record video confirming whether a driver or package recipient follows directions or protocols to prevent injury or package damage because of the package weight or shape.

Video capability in a room, facility, conveyor belt, or other areas designated for holding or moving packages can provide evidence of undamaged or damaged packages at certain times. Captured video or images of each side of the package can serve to verify damage. The package tracking system saves video or images, with the time when such video or images were taken, in a record associated with the package. The video or series of images can serve to illustrate when damage occurred, if any, and whether such damage occurred as a result of personnel, equipment, or a vehicle mishandling, throwing, dropping, or abruptly moving the package. The record produced by these images can help resolve matters, such as insurance claims and liability disputes, providing evidence of who handled the package and when.

In one embodiment, the package tracking system notifies a recipient when their package has arrived at the package room. Notification can occur in response to entry of package identification information into the system or registration of the package in the package room. The data capture, followed by package registration, operates to acquire the recipient's name and address information, for example, through character recognition of the shipping label on the package, a bar code scan, or manual input of the recipient's name and address information. An electronic file maintains a list of residents in a particular building, complex, or residence, including contact information (e.g., telephone number, email address). Using the recipient name and address information acquired from the package, the package tracking system searches the electronic file containing the list of residents for a match, in order to find the intended recipient and obtain the contact information of the recipient. After confirming the intended recipient, a notification is sent using the acquired contact information, by email, an electronic text message to a cell phone, or any other related communication means. Notification can include an alert that the package has been delivered, the time, a picture of the package in the room, and a code for gaining access to the package room when retrieving the package.

The package tracking system can also send a notification to a package delivery service in the event someone leaves the package at a location (i.e., package room) that is not the final destination (i.e., the residence of the package recipient). Such a package requires additional delivery to reach the recipient. For example, if the package resides at a package room at a retail location or at a remote drop off (pickup location), a notification can be sent to a ride sharing service or package delivery sharing service to get the package. Provided authorization has been given to the service for delivery sharing, the delivery service can obtain the package from the package room and deliver the package to the addressee. This service can be part of the package tracking system, which improves the last mile delivery process for both package recipients and couriers.

For authentication of delivery service drivers, additional security features can be added, for example, fingerprint or retina scanning, face recognition, and pin or ID code registration. A database stores a record of all user transactions for each package delivered, including, but not limited to, who handled the package, placed the package in the package room, removed the package from the package room, when each user transaction occurred, the handling conditions under which the transaction took place.

As previously described, when a person or courier service delivers a package to the package room, the recipient receives a notification that their package has arrived. The notification includes a code needed to obtain the package from the package room. The recipient may authorize another individual or service to retrieve the package from the package room on behalf of the recipient. To accomplish this authorization, the recipient accesses the package tracking system (remotely, through an application program running on a computer or mobile device, such as a smart phone), submits the code received in the notification (or related means of verification) to the package tracking system, and notifies the package tracking system that another individual or service, other than the recipient, will be coming to pick up the package. The recipient can require that the package tracking system provide a new, different code to be used by the authorized individual or service when picking up the package. Alternatively, the recipient can give the original code (the one received in the notification) to the deputized individual in order to gain access to the package room holding the package. That deputized individual submits this code to the package tracking system when retrieving the package from the package room on behalf of the recipient. In either instance, the package tracking system can capture video of the person who picks up the package. In event of a dispute, this video record can prove when the package was retrieved and by whom.

This authorization feature can also be used to redirect package delivery locations (i.e., package rooms). For example, if the facility with the package room is inconveniently located (e.g., the recipient has changed address of residence), the recipient can remotely send a notification to the package tracking system identifying another location (i.e., package room) preferred by recipient for package delivery. In real-time, the package tracking system can change the location of the package delivery to the location chosen by the recipient.

When a delivery service or a designated authorized driver delivers a package to a package room, the package tracking system can record certain details useful to evaluate the delivery service. For example, the cameras of the package tracking system can capture on video a package delivery service driver who shakes, drops, or forcefully removes the package from the package room. The package tracking system can then send this video record to the package recipient, to the service company employing the driver, or both, to bring to attention that the driver improperly handled the package. In addition to monitoring package handling, the package tracking system can maintain a record of the e the package is removed from the package room to the time the package reaches the final destination of the package recipient. Retailers, for example, can use this record to rate the delivery service, with such ratings being used for quality assurance, tied to fees paid for delivery.

The package tracking system can also be used for outbound packages, that is, for packages awaiting removal (i.e., pick-up) from the package room. When a package is placed into the room, a notification is sent automatically to the courier delivery service, indicating that the package is in the package room, ready for pick-up and delivery to another location. This drop off feature of the package tracking system can be used for outbound packages, returned packages, packages that were damaged or not supposed to be delivered. Drop off can also be accomplished without a notification feature by designating a drop off area within the package room that the couriers or delivery service understands is specifically intended for outbound packages.

The package tracking system can use environmental factors for scheduling package pickup and drop off, and for alerting recipients and delivery personnel of inclement weather or traffic conditions that may delay or risk safe package transport. Industry has produced various publicly available apps that provide weather or traffic conditions, for example, The Weather Charmer™, provided by IBM, and Google Maps™, offered by Google. The package tracking system has interfaces to weather or traffic apps, such as these, from which the package tracking system acquires relevant data. Weather factors and traffic conditions can be important to help coordinate the timing and routing of package deliveries and retrievals. Rain or snow conditions may be factored in to determine if a package is damaged by water, ice, or snow.

Through data management and identification of package shipments and deliveries, an embodiment of the package tracking system monitors for suspicious or potentially illegal shipments or activities by recognizing certain characteristics of deliveries of goods to certain locations from either flagged manufacturers or locations. Locations or manufacturers known to source illegal or dangerous materials, for example, could be recognized as such and, if the number of packages from these locations sent to a particular address exceeds a certain threshold, the address can be flagged and the appropriate security organizations alerted.

The package tracking system, in addition to weather and traffic conditions, can monitor room or related package storage and transportation environments to protect against temperature, humidity, elevation, vibration, or other factors that may compromise the safe storage conditions of packages. Sensors could be placed within the storage or transportation spaces to help identify safe conditions for package storage and alert appropriate personnel should conditions fall beyond a predetermined safe range, for a package room that has become too hot or too cold.

In one embodiment, the package tracking system deploys weight sensors in the package room, to help confirm the placement and location of a package in the package room. An example of the use of weight sensors in package tracking systems appears in U.S. application Ser. No. 15/259,474, filed Sep. 8, 2016, titled "System and Method of Object Tracking Using Weight Confirmation," the entirety of which is incorporated by reference herein. The package tracking system can collect the weight data measured by the weight sensors along the shipping route of the package: when at the distribution hub personnel first places the package in the delivery truck, then as the truck travels along the route to the package room, then again when personnel removes the package from the trucks and deposits it in the package room. While the package sits on a shelf, whether within the truck or in the package room, the package tracking system can take weight measurements periodically. The collected package weight can serve to verify the condition of the package, to identify changes to the package along the shipping route, to suggest the type of handling and delivery needed for the package (e.g., heavy packages require careful lifting to reduce the risk of injury), to suggest the proper placement for a package (e.g., heavy packages should not be placed atop of other packages, especially on lighter ones). The package tracking system can store such collected package weight data, to enhance the recorded history of the package, such as its delivery, quality, and status.

The package tracking system can build a record of various aspects of those packages registered with the system. A record can include images of the package during its shipping route and upon final destination delivery, the speed at which the package moved when placed in a package holding area that is being monitored by camera, the package location in package holding area, the placement of the package with respect to other package placements (e.g., if other packages are placed on top of package), and images of personnel who delivered or handled the package and of residents or designates who picked up the package. In addition, the record can include data measured by any sensors employed by the package tracking system. The package tracking system can monitor this data, which provides a record of package delivery, quality and status. Personnel may find this data useful for improving delivery quality, verifying or denying insurance claims on damaged packages, and improving security on drop off or pickup.

This data about the packages can help resolve matters with customers, for example, in the event a customer reports receiving a damaged package. Further, customers can photograph a damaged package and send the image to the package tracking system, for example, by attaching the image to an electronic reply to a previously received package notification, or by some other communication means. The customer's smart phone can run an application program App) that provides an interface to the platform of the package tracking system and provides a simple means to communicate any issues, check on the delivery status of the package, or review any information of interest about the package, like current location. An image submitted by a customer serves as evidence of the package condition, and includes the time when the image was taken. Personnel can review the data collected for the package by the package tracking system, including the photograph taken of the package by the customer. Data and image comparisons may prove package damage.

Delivery-Sharing System

One embodiment of the package tracking system may improve the efficiency of last-mile package delivery by incorporating a crowd-sourced ride sharing model. The package tracking system can capitalize on existing ride-sharing services, like Uber$^{SM}$ and Lyft$^{SM}$, by establishing a marketplace where bids may be placed on the delivery of packages to their final destinations. For example, consider a retailer that uses the package tracking system to sort and manage online purchases or out-of-stock purchases. The retailer typically receives and holds these purchases at the premises for later pickup by customers. But rather than have the customer travel to the store to get a package, the package tracking system can bid out the delivery to the final destination (i.e., the premises of the customer). Any authorized driver can accept a bid, pick up the package from the store, and deliver the package to the customer.

For instance, if the retailer is holding a package for a customer in a neighboring town, and an authorized driver is presently in the store and planning to drive to that town, the driver can accept the bid and be paid a predetermined amount to make that final destination delivery, often in their own personal vehicle. The customer benefits by not having to make the trip to the store and by typically receiving delivery sooner than would have been otherwise; the retailer benefits economically by reduced delivery costs, and from a satisfied customer; and the community benefits through lighter vehicle traffic achieved by leveraging the crowd-sourced drivers who are already planning to travel near the final destinations, in vehicles that require less fuel than typical shipping trucks.

In addition or in the alternative, the package tracking system can permit customers of the retailer to join a delivery sharing network. If a customer who is a member of the delivery sharing network is presently at the store to pick up a package, the customer can determine, through the package tracking system, whether the store is holding any packages for neighbors or other members of town. Upon request from the customer interested in determining what packages are in the package room awaiting delivery and the addresses of their intended package recipients, the computing system ay display a list of packages and the associated bids. The computing system may be configured to filter the list of packages geographically. The customer can thus choose to deliver any such package to its final destination by removing the package from the package room as previously described. In this instance where the customer is part of the delivery sharing network, the package tracking system further leverages efficiencies in demographic similarities in customer travel, shopping habits, and residential address proximities. The computing system (e.g., 804 in FIG. 8) stores a database of persons authorized to take packages from the package room for transport to a package recipient.

In one embodiment, the package tracking system provides an access code to the smartphone of the person who accepts the bid. This smartphone can then act as an automatic identification verifier. When this person comes to the package room to retrieve the package, the person submits the access code to the computing system in any one of a variety of ways. For example, the smartphone can transfer the access code in a RF transmission (e.g., WiFi, Bluetooth™), provided the computing system is configured with an RF receiver. Alternatively, optical code verification can be used for the computing system to acquire the code from the smartphone. In this instance, the screen of the smartphone displays a barcode or a QR code, and the computing system is configured with an optical reader to scan the code displayed on the screen. When the computing system recognizes the code, the person is permitted to access the package room and retrieve the package.

When the package tracking system detects that the person has removed the package from the package room, the computing system is configured to notify the particular package recipient that the package has been taken. The notification may include the identity of the person delivering the package and the estimated delivery time. The computing system may also notify personnel responsible for managing the package room that the person who accepted the bid has taken the package from the package room. Such personnel may require the person to demonstrate authorization for removing the package (e.g., the access code). In response to receiving the package, the particular package recipient may send a confirmation to the computing system (e.g., through an app on a smartphone that can communicate with the package tracking system, for instance, over the Internet). The person bringing the package to the intended package recipient may also communicate with the package tracking system to indicate completion of the delivery. The computing system can then compute an amount of the time between removal of the given package from the package room and receipt of the package by the intended package recipient, which can serve as a metric for evaluating the delivery performance of that member of the package delivery-sharing system. In embodiments wherein the computing system has access to weather services, traffic conditions, or both, the computing system can take current conditions into account when evaluating the person's delivery performance, or when scheduling or estimating when such delivery can be completed.

Light-Based Features

As previously described, some embodiments of package tracking systems described herein include light guidance features, wherein a light, laser or light projector shines onto or near the package to be picked up or at the area where the package is to be placed. Use of the laser or light source can provide further include functionality beyond light guidance. For example, consider an embodiment of a package tracking system that includes a light projector, that light projector can superimpose images or notifications on the package or across the area where the package is to be placed. For example, when coming to pick up a package, a resident can see a notification of an upcoming event to be held on the premises as a text image superimposed on the package being picked up. For delivery, the driver may see a text message projected onto the area where the package is to be placed, for example, warning of a storm approaching the area or indicating that the package is fragile and requires handling care.

As another example, the superimposed image displays an outline around an area within the package room. This outline corresponds to a field of view of a given optical sensing device (i.e., camera). When setting up a package room, personnel can judge from the location of this visible outline whether the field of view of the camera is properly covering the desired area, and can adjust the camera, if need be, to achieve the desired coverage. In one embodiment, the light source is coupled directly to a camera. The outline produced by the light source is predetermined by this physical coupling; the coupling determines where the outline appears. In another embodiment, the light source is separate from and independent of the camera. To determine where the light source displays the outline so that the outline accurately corresponds to the field of view of the camera requires calibration between the camera and light source.

As will be appreciated by one skilled in the art, aspects of the systems described herein may be embodied as a system, method, and computer program product. Thus, aspects of the systems described herein may be embodied in entirely hardware, in entirely software (including, but not limited to, firmware, program code, resident software, microcode), or in a combination of hardware and software. All such embodiments may generally be referred to herein as a circuit, a module, or a system. In addition, aspects of the systems described herein may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. The computer readable medium may be a non-transitory computer readable storage medium, examples of which include, but are not limited to, an electronic, magnetic, optical, electromagnetic, infrared, or semiconductor system, apparatus, or device, or any suitable combination thereof.

As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium is not a computer readable propagating signal medium or a propagated signal.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's device, partly on the user's device, as a stand-alone software package, partly on the user's device and partly on a remote computer or entirely on a remote computer or server. Any such remote computer may be connected to the user's device through any type of network, including a local area network (LAN) or a wide area network (WAN), or the connection may be made to an external computer (for example, through the Internet using an Internet Service Provider).

Additionally, the methods described herein can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the proposed methods herein can be used to implement the principles described herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with the principles described herein is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, a microprocessor, or the like. In these instances, the systems and methods of the principles described herein may be implemented as program embedded on personal computer such as JAVA® or CGI script, as a resource residing on a server or graphics workstation, as a plug-in, or the like. The system may also be implemented by physically incorporating the system and method into a software and/or hardware system.

While the aforementioned principles have been described in conjunction with a number of embodiments, it is evident that many alternatives, modifications, and variations would be or are apparent to those of ordinary skill in the applicable arts. References to "one embodiment" or "an embodiment" or "another embodiment" means that a particular, feature, structure or characteristic described in connection with the embodiment is included in at least one embodiment described herein. A reference to a particular embodiment within the specification do not necessarily all refer to the same embodiment. The features illustrated or described in connection with one exemplary embodiment may be combined with the features of other embodiments. Accordingly, it is intended to embrace all such alternatives, modifications, equivalents, and variations that are within the spirit and scope of the principles described herein.

What is claimed is:

1. A package management system comprising:
one or more light sources configured to draw attention of a recipient of a package to different locations of a surface used to hold the package for the recipient;
a weight sensor operably coupled to the surface to measure weight on the surface; and
a computing system including one or more processors configured to register the package as being at a given location on the surface, to electronically receive information that indicates the recipient is coming to retrieve the package, to activate, in response to the received information, the one or more light sources such that the one or more light sources guide the recipient to where the package is registered as being located, and to confirm proper removal of the package from the surface if the weight sensor measures a decrease in weight at the given location on the surface after the one or more light sources guide the recipient to the package.

2. The package management system of claim 1 further comprising an optical sensing device positioned to take one or more images of the package being removed from the surface.

3. The package management system of claim 2 wherein the one or more processors is configured to detect a presence of the recipient based on the one or more images taken by the optical sensing device.

4. The package management system of claim 2 wherein the one or more processors is configured to send the one or more images taken by the optical sensing device, overlaid with one or more augmented reality markings, to a mobile electronic device carried by the recipient, wherein the one or more augmented reality markings serve to guide the recipient to the package.

5. The package management system of claim 4, further comprising a radiofrequency (RF) positioning system configured to determine a position of the mobile electronic device of the recipient using RF signals transmitted by the mobile electronic device; and wherein the one or more processors are configured to use the position of the mobile electronic device of the recipient to determine a viewpoint of the mobile electronic device, to use the one or more images taken by the optical sensing device to produce a camera view of the package on the surface from this viewpoint, to overlay the augmented reality markings onto this camera view, and to send this camera view overlaid with the augmented reality markings to the mobile electronic device of the recipient to serve as a guide toward the package.

6. The package management system of claim 2 wherein the one or more processors is configured to send an image of the package taken by the optical sensing device to the recipient for viewing on an electronic device of the recipient.

7. The package management system of claim 2 wherein the one or more processors is configured to further confirm proper removal of the package from the surface if the one or more images taken by the optical sensing device demonstrates absence of the package at the given location after the computing system electronically receives the information that indicates the recipient is coming to retrieve the package.

8. The package management system of claim 2, wherein the one or more light sources is disposed at a front edge of the surface, and wherein the processor is configured to cause the one or more light sources to display a message that guides the recipient to the package.

9. A package management system comprising:
an optical sensing device positioned to take one or more images of a package on a surface holding the package, the package being intended for a recipient; and
a computing system including one or more processors, memory, and executable code stored on the memory, the one or more processors being configured by executing the executable code to register the package as being at a given location on the surface, to electronically receive information that indicates the recipient is coming to retrieve the package, and to overlay, in response to the received information, one or more augmented reality markings on the one or more images taken by the optical sensing device of the package on the surface, the one or more augmented reality markings being overlaid on the one or more images in a manner designed to guide the recipient to where the package is registered as being located, and wherein the one or more processors are further configured to send the one or more images with the one or more augmented reality markings to a mobile electronic device of the recipient for display thereon.

10. The package management system of claim 9 wherein the one or more processors is configured to confirm proper removal of the package from the surface if the one or more images taken by the optical sensing device demonstrates absence of the package at the given location.

11. The package management system of claim 9 further comprising a weight sensor operably coupled to the surface to measure weight on the surface; and wherein the one or more processors are configured to confirm proper removal of the package from the surface if the package is registered as being at the given location and a decrease in weight occurs at the given location on the surface.

12. The package management system of claim 9 further comprising one or more light sources configured to draw attention of the recipient to different locations of the surface; and wherein the one or more processors is further configured to activate, in response to the received information, the one or more light sources such that the one or more light sources guide the recipient to where the package is registered as being located.

13. The package management system of claim 9 wherein the one or more processors is configured to detect a presence of the recipient based on the one or more images taken by the optical sensing device.

14. The package management system of claim 9, further comprising a radiofrequency (RF) positioning system configured to determine a position of the mobile electronic device of the recipient using RF signals transmitted by the mobile electronic device; and wherein the one or more processors are configured to use the position of the mobile electronic device of the recipient to determine a viewpoint of the mobile electronic device, to use the one or more images taken by the optical sensing device to produce a camera view of the package on the surface from this viewpoint, to overlay the augmented reality markings onto this camera view, and to send this camera view overlaid with the augmented reality markings to the mobile electronic device of the recipient to serve as a guide toward the package.

* * * * *